United States Patent
Nakashima et al.

(10) Patent No.: US 11,648,912 B2
(45) Date of Patent: May 16, 2023

(54) VEHICLE STARTING CONTROL SYSTEM, VEHICLE-MOUNTED DEVICE, VEHICLE, SERVER, VEHICLE STARTING METHOD, VEHICLE STARTING PROGRAM AND STORAGE MEDIUM

(71) Applicant: GLOBAL MOBILITY SERVICE INC., Tokyo (JP)

(72) Inventors: Tokushi Nakashima, Tokyo (JP); Keita Danjyo, Tokyo (JP); Satoshi Takahashi, Tokyo (JP)

(73) Assignee: GLOBAL MOBILITY SERVICE INC., Tokyo (JP)

( * ) Notice: Subject to any disclaimer, the term of this patent is extended or adjusted under 35 U.S.C. 154(b) by 29 days.

(21) Appl. No.: 16/982,162

(22) PCT Filed: Mar. 20, 2018

(86) PCT No.: PCT/JP2018/011227
§ 371 (c)(1),
(2) Date: Sep. 18, 2020

(87) PCT Pub. No.: WO2019/180855
PCT Pub. Date: Sep. 26, 2019

(65) Prior Publication Data
US 2021/0024035 A1 Jan. 28, 2021

(51) Int. Cl.
*B60R 25/04* (2013.01)
*B60R 25/20* (2013.01)
(Continued)

(52) U.S. Cl.
CPC .......... *B60R 25/04* (2013.01); *B60R 25/2018* (2013.01); *B60R 25/246* (2013.01); *G06Q 20/341* (2013.01); *G07F 17/0057* (2013.01)

(58) Field of Classification Search
None
See application file for complete search history.

(56) References Cited

U.S. PATENT DOCUMENTS

| 2,650,354 | A | * | 8/1953 | Joiner, Jr. | ........... | B60R 25/1018 |
| | | | | | | 340/426.28 |
| 4,612,729 | A | * | 9/1986 | Sato | ..................... | E05F 15/638 |
| | | | | | | 49/362 |

(Continued)

FOREIGN PATENT DOCUMENTS

CN 203237208 U 10/2013
CN 106611368 A 5/2017
(Continued)

OTHER PUBLICATIONS

Office Action in KR application No. 10-2020-7029957, dated Dec. 24, 2021. 10pp.
(Continued)

*Primary Examiner* — Carlos Garcia
(74) *Attorney, Agent, or Firm* — Hauptman Ham, LLP

(57) ABSTRACT

A vehicle starting control system includes a server for managing a starting state of a vehicle and a vehicle-mounted device for controlling the starting state of the vehicle based on a control command for controlling the starting state of the vehicle provided from the server. The server is accessibly connected to a financial system and can monitor a status of payment of a predetermined charge for the vehicle via the financial system. When the payment of the predetermined charge for the vehicle is detected, the server can control the starting state of the vehicle by providing the vehicle-mounted device with the control command for controlling the starting state of the vehicle via at least one of a communication means, a mobile terminal, and an IC card.

10 Claims, 13 Drawing Sheets

(51) Int. Cl.
*B60R 25/24* (2013.01)
*G06Q 20/34* (2012.01)
*G07F 17/00* (2006.01)

(56) References Cited

U.S. PATENT DOCUMENTS

| | | | |
|---|---|---|---|
| 7,671,724 B2 | 3/2010 | Mori et al. | |
| 9,371,056 B2* | 6/2016 | Lunstedt | H04W 4/40 |
| 9,373,201 B2* | 6/2016 | Jefferies | B60R 25/045 |
| 2001/0034612 A1* | 10/2001 | Hayashi | G06Q 10/025 |
| | | | 705/330 |
| 2011/0112969 A1 | 5/2011 | Zaid et al. | |
| 2012/0056734 A1* | 3/2012 | Ikeda | G08G 1/165 |
| | | | 340/425.5 |
| 2015/0343993 A1 | 12/2015 | Ferrieres et al. | |
| 2018/0048309 A1* | 2/2018 | Vogt, IV | H04L 67/125 |
| 2021/0024035 A1* | 1/2021 | Nakashima | G07C 5/008 |

FOREIGN PATENT DOCUMENTS

| | | |
|---|---|---|
| JP | H586762 A | 4/1993 |
| JP | 2007261495 A | 10/2007 |
| JP | 201144112 A | 3/2011 |
| JP | 2014-85758 A | 5/2014 |
| JP | 2014146120 A | 8/2014 |
| JP | 2016511191 A | 4/2016 |
| JP | 2016206715 A | 12/2016 |
| JP | 6238038 B1 | 11/2017 |
| KR | 1020120116924 A | 10/2012 |
| KR | 1020130056556 A | 5/2013 |
| KR | 10-2015-0142656 A | 12/2015 |
| WO | 2016167350 A1 | 10/2016 |
| WO | 2016201355 A1 | 12/2016 |

OTHER PUBLICATIONS

International Search Report in PCT/JP2018/011227, dated Jun. 26, 2018. 5pp.
Keisuke Nakamura, "Opening TPPs and API in the Financial Sector: Points to Keep in Mind for Security." Kinyu Kenkyu, Jul. 20, 2017, vol. 36, No. 3, pp. 83-110, 34pp.
Written Opinion in PCT/JP2018/011227, dated Jun. 26, 2018. 11pp.
Extended European serch report in EP application No. 18910678.4, dated Sep. 21, 2021, 9pp.
Office Action in KR application No. 10-2020-7029957, dated Jun. 9, 2021. 15pp.
Office Action in CN application No. 201880091407.6, dated May 19, 2021. 16pp.
Office Action in KR application No. 10-2020-7029957, dated Oct. 19, 2022, 11pp.
Office Action in KR application No. 10-2022-7044540, dated Mar. 10, 2023, 9pp.

* cited by examiner

[Fig.1]
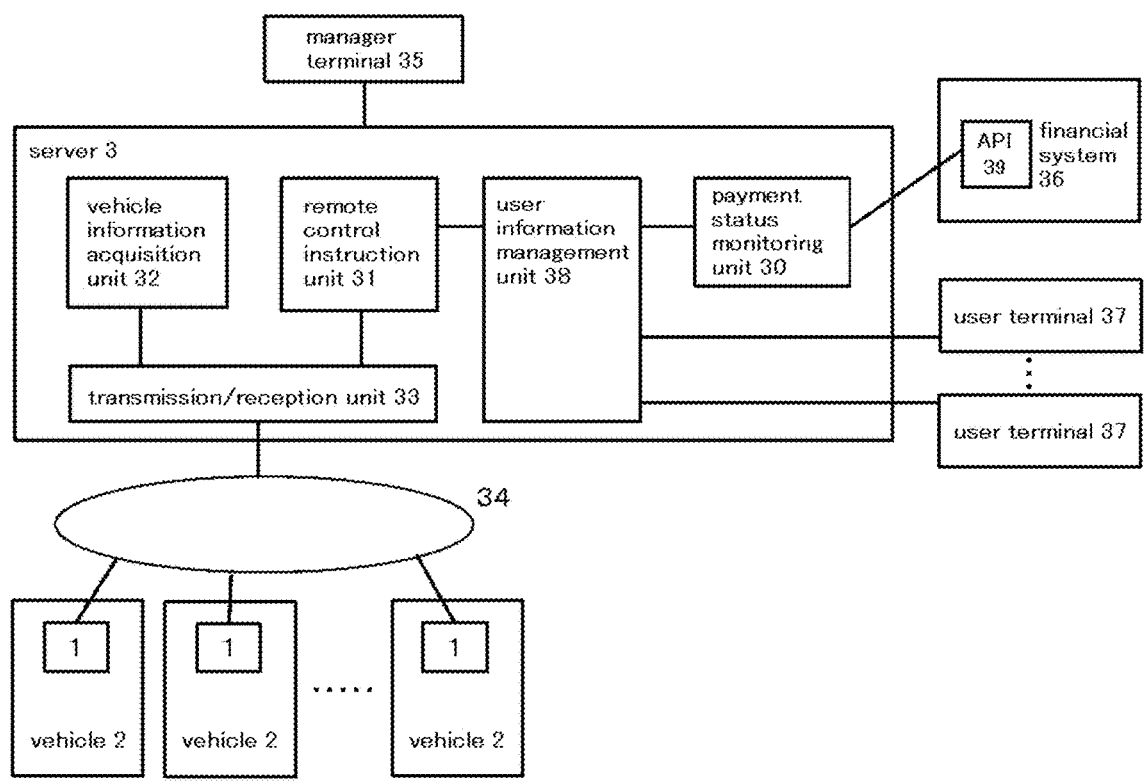

[Fig.2]
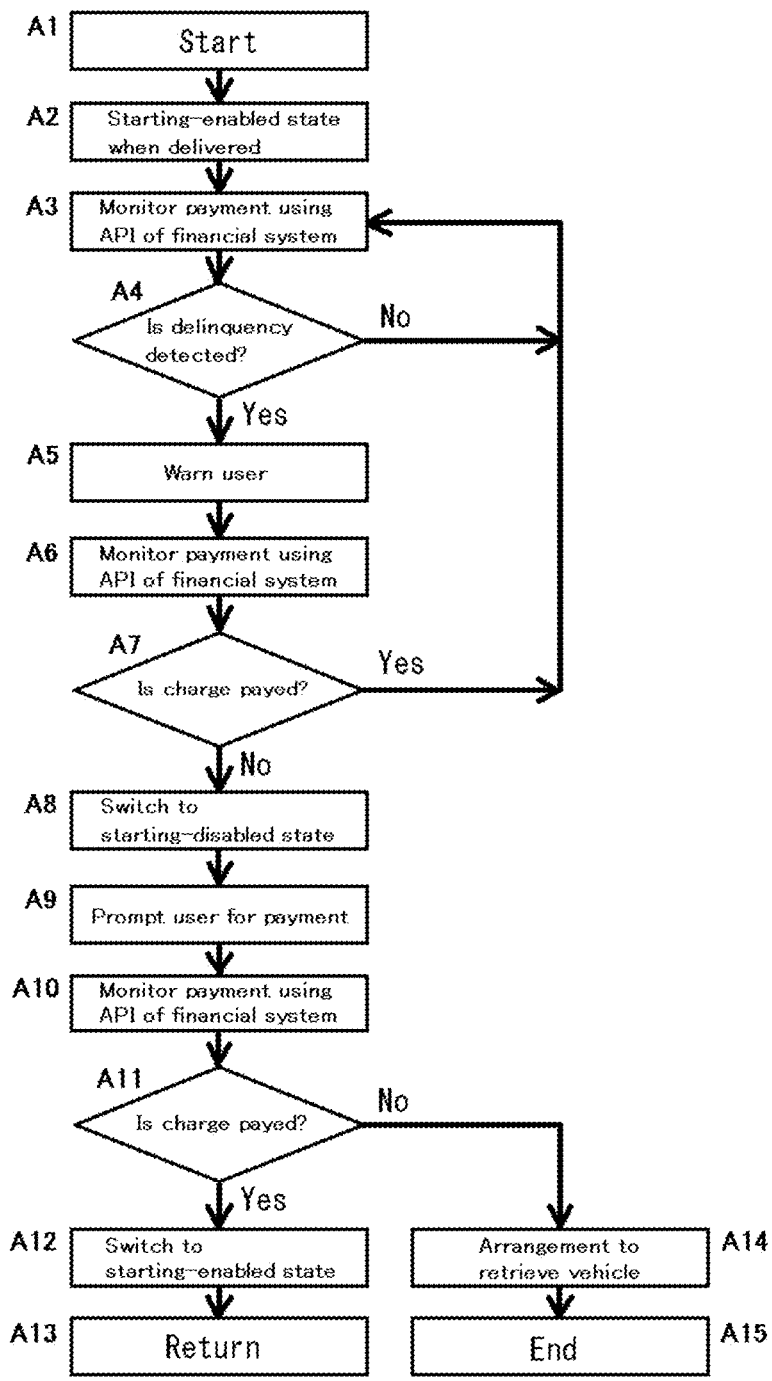

[Fig.3]
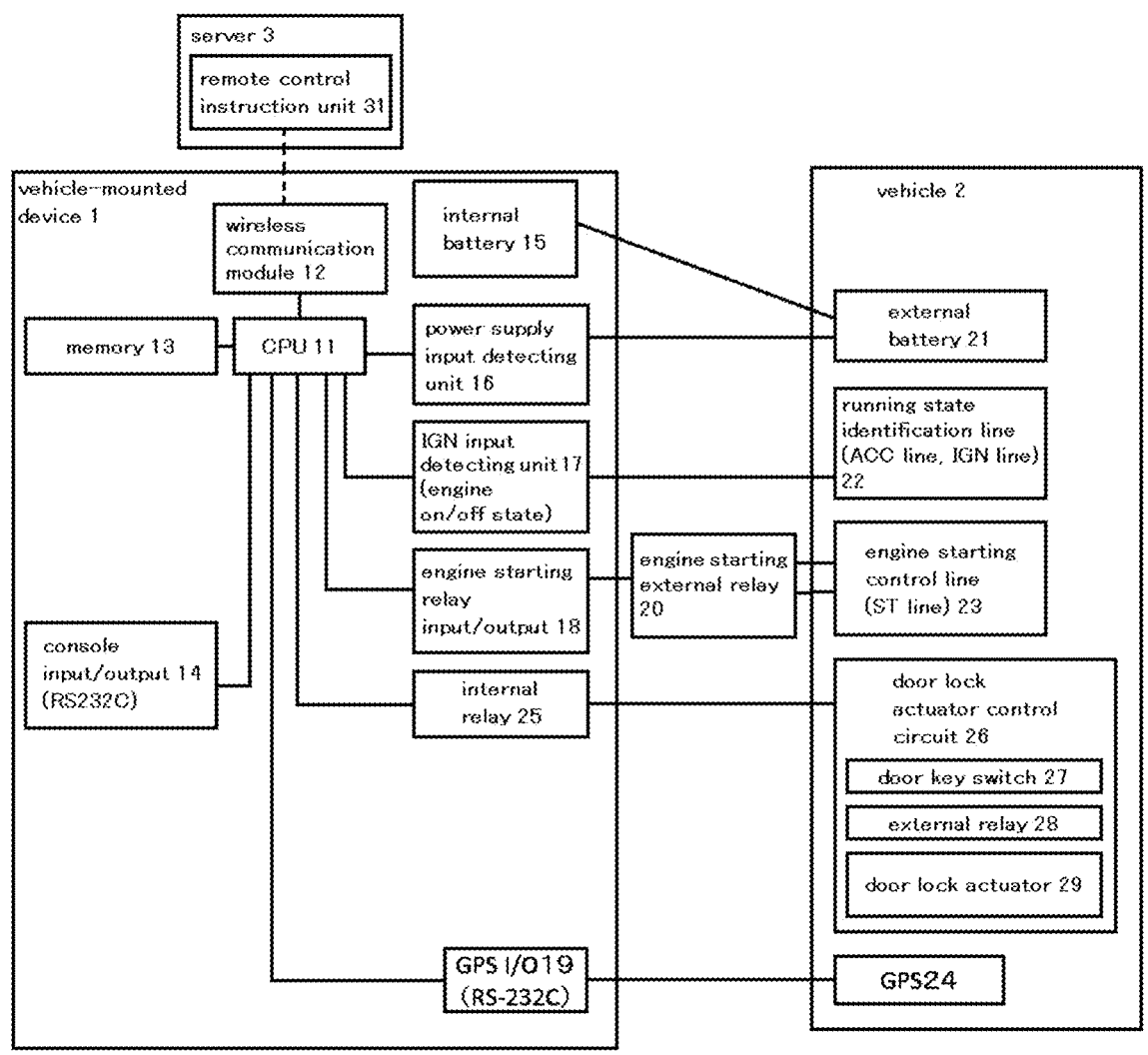

[Fig.4]

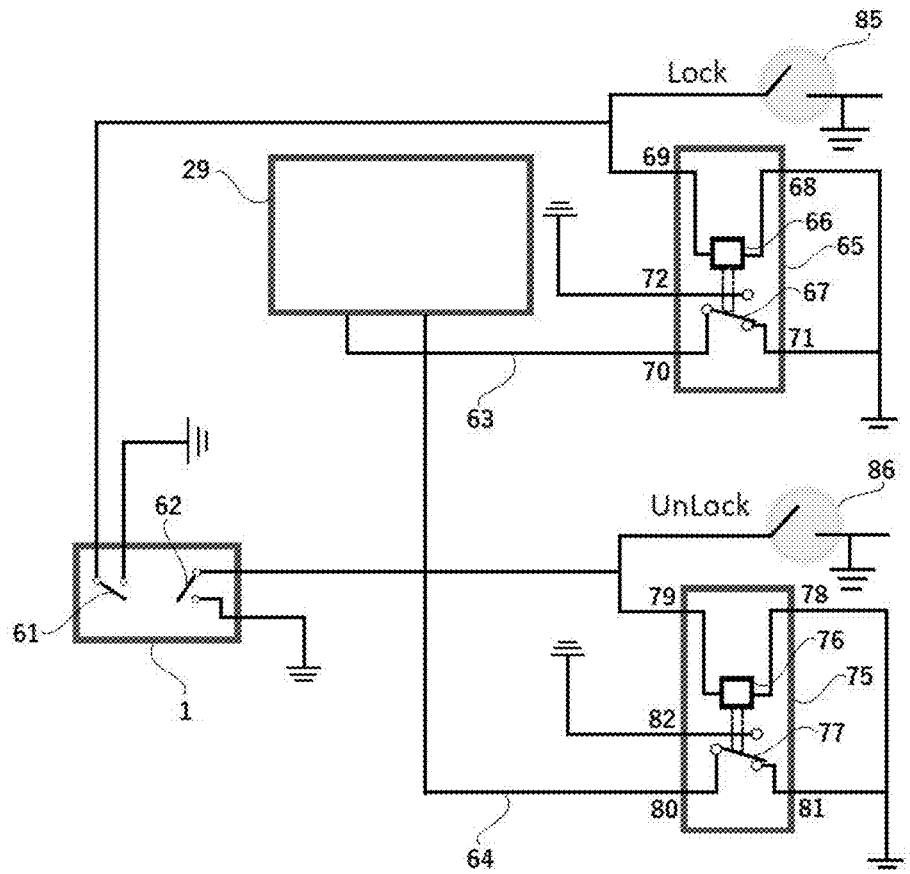

[Fig. 5A]

Relay A

| state | relay value |
|---|---|
| Open | 0 |
| Close | 1 |

| combination | status | vehicle state |
|---|---|---|
| 0 0 | starting-enabled state | starting-enabled |
| 0 1 | starting-disabled state | starting-disabled |

[Fig. 5B]

| Relay A | | Relay B | |
|---|---|---|---|
| state | relay value | state | relay value |
| Open | 0 | Open | 0 |
| Close | 1 | Close | 1 |

| combination | status | vehicle state |
|---|---|---|
| 0 0 | starting-enabled state | starting-enabled |
| 0 1 | unintended value | starting-enabled |
| 1 0 | unintended value | starting-enabled |
| 1 1 | starting-disabled state | starting-disabled |

[Fig.6]
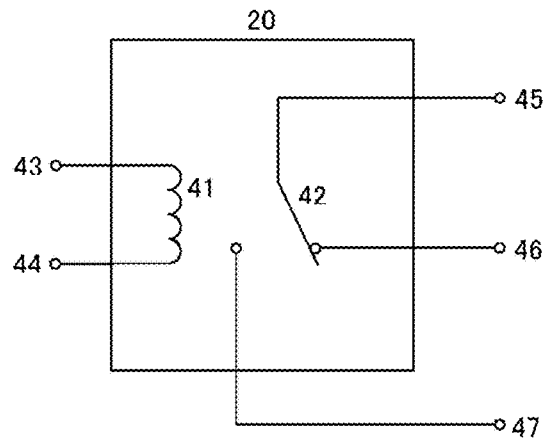
[Fig.7]
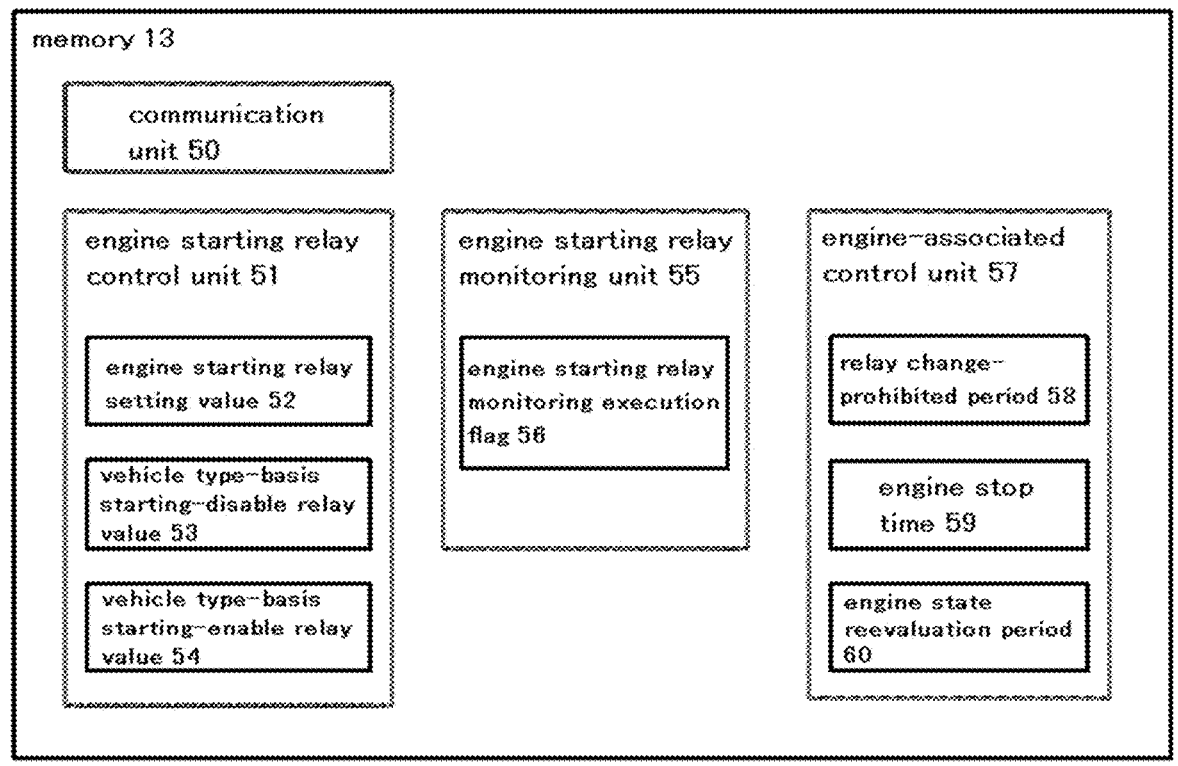

[Fig.8]
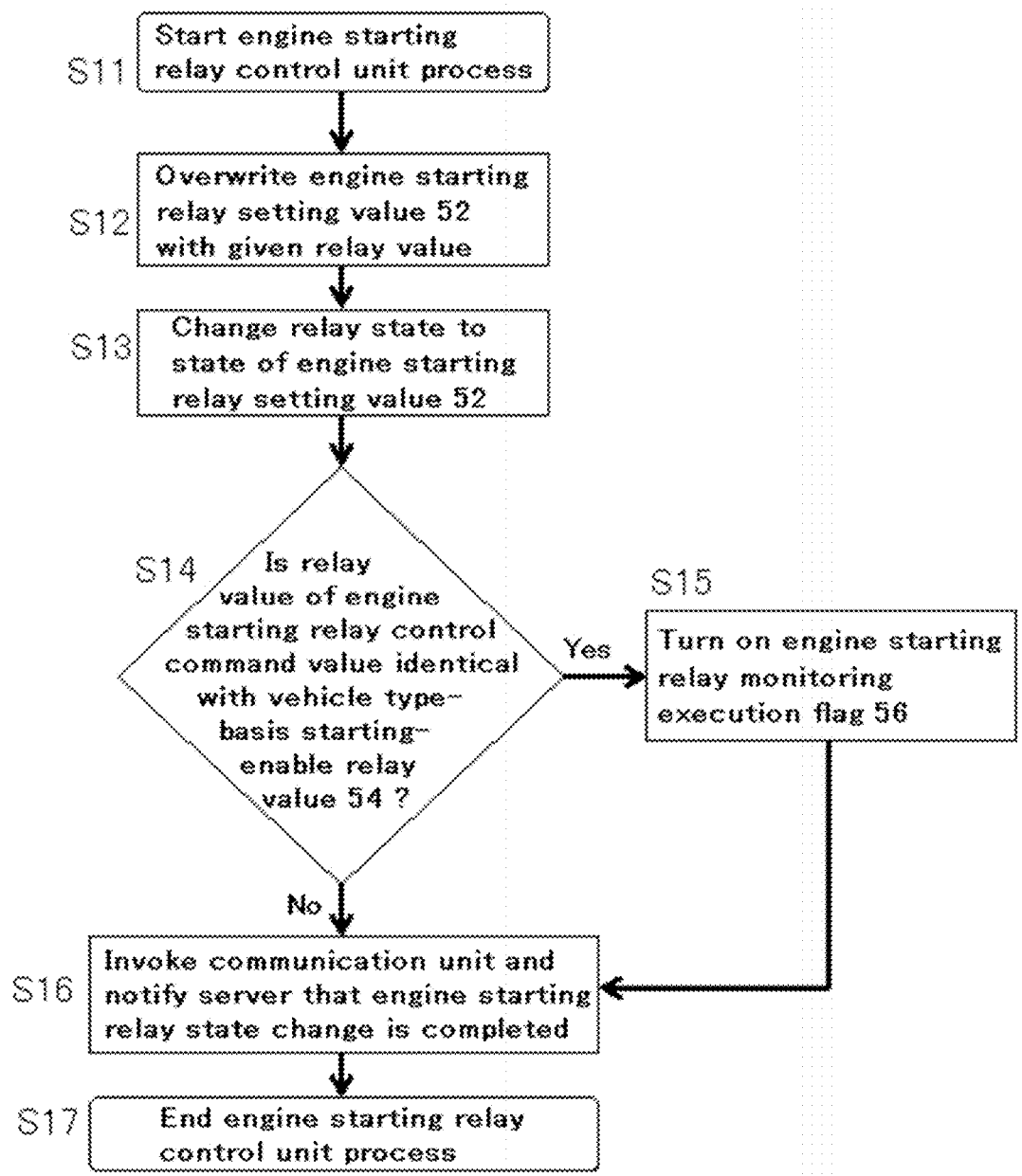

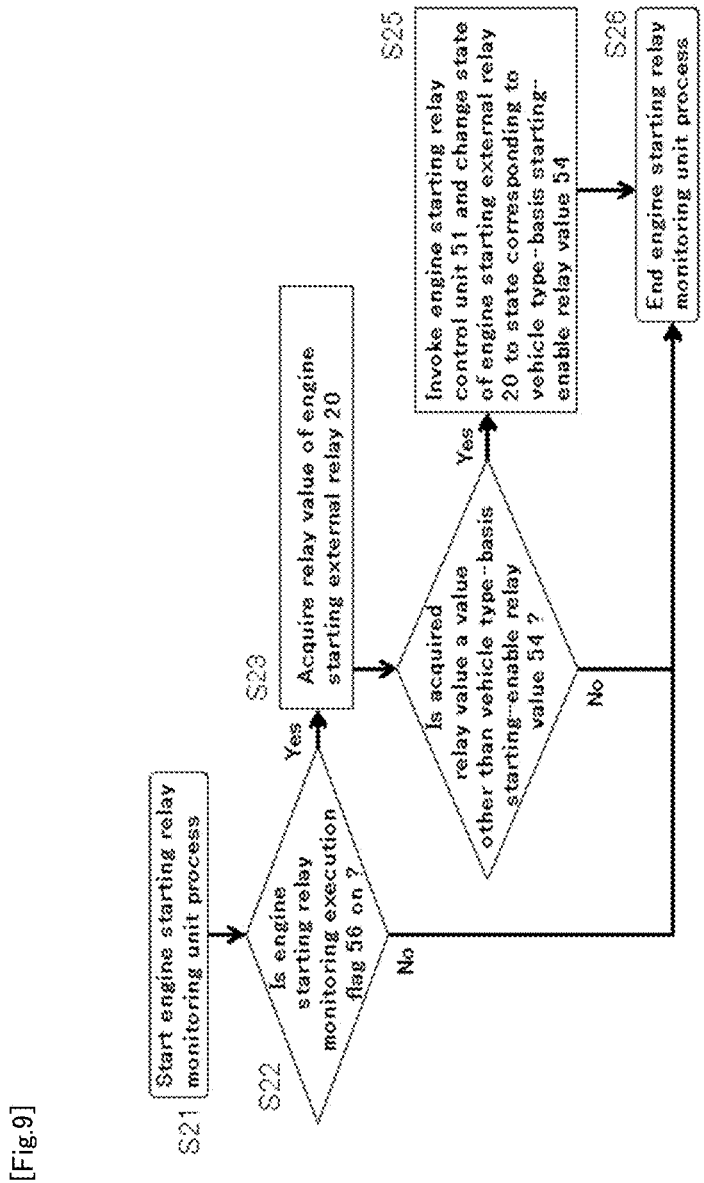

[Fig.10]
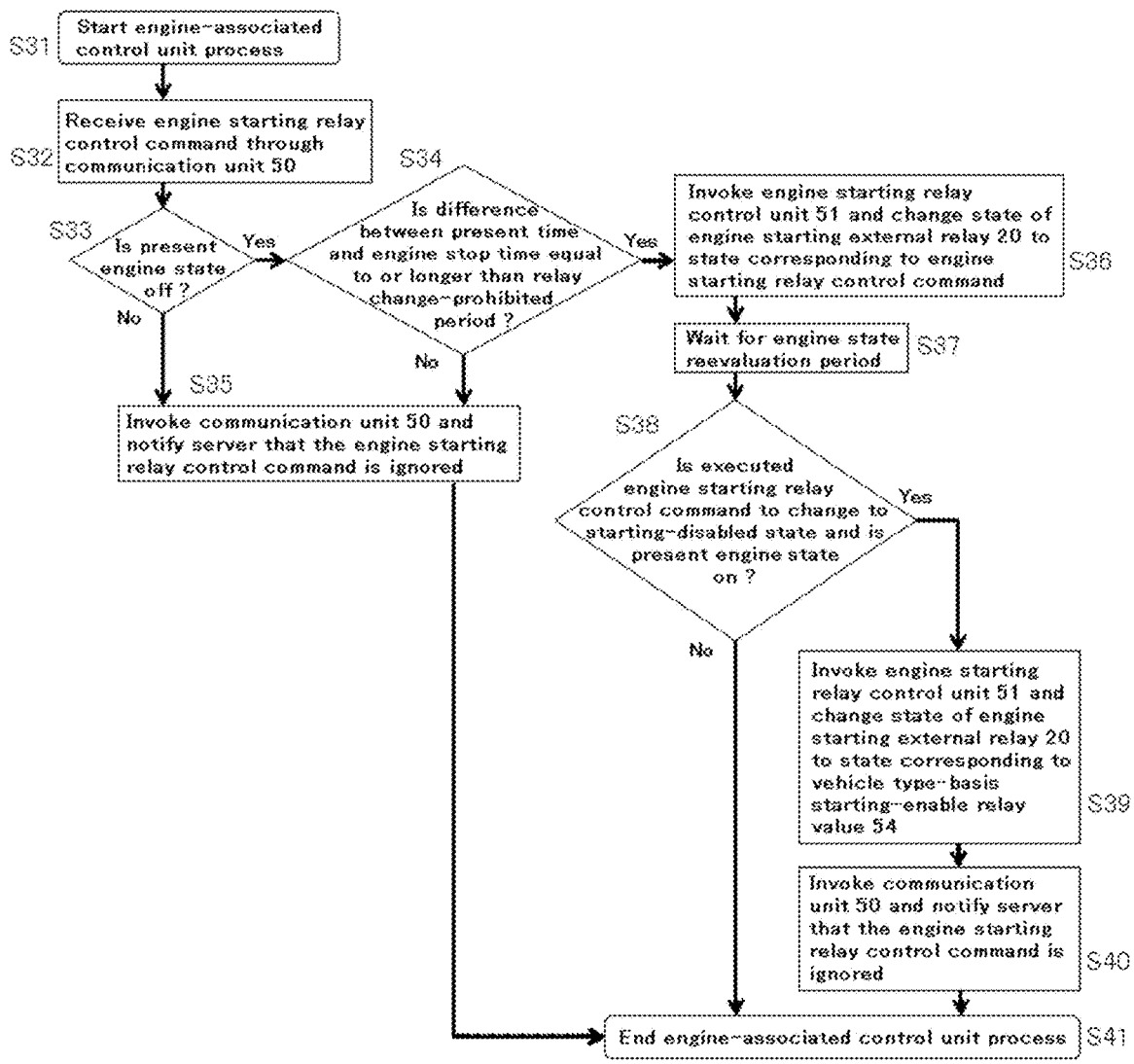

[Fig.11]
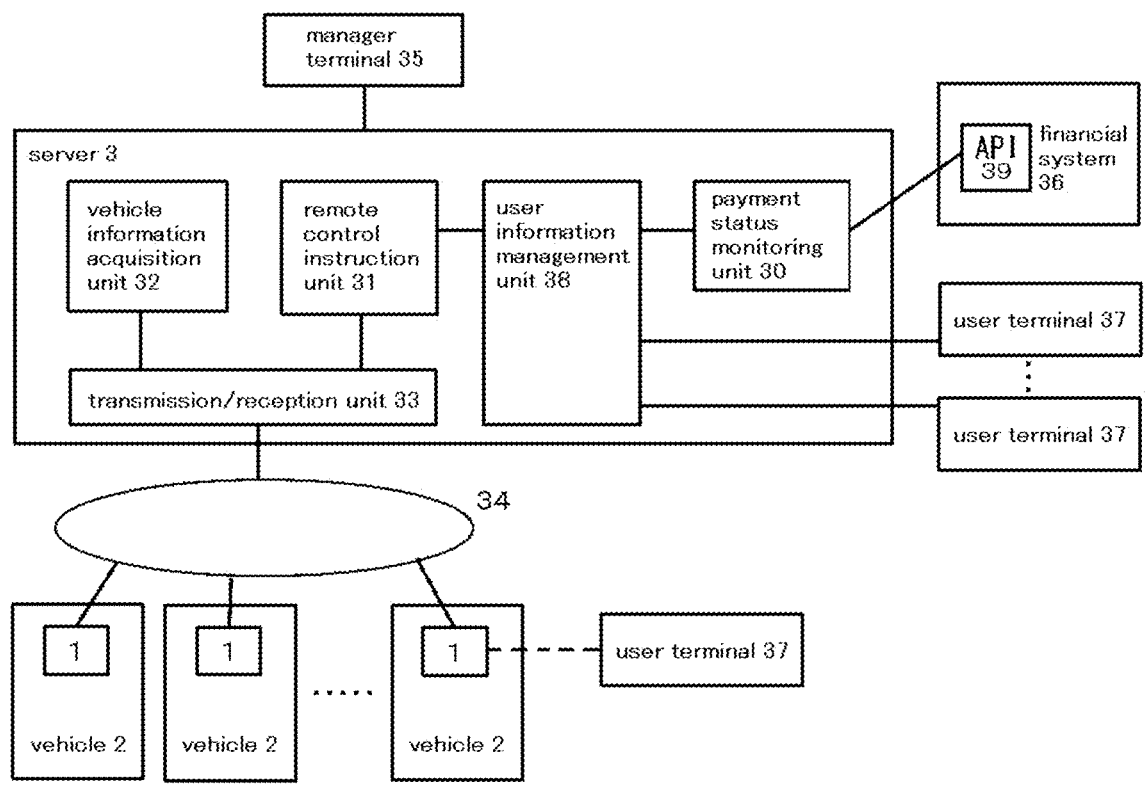

[Fig.12]
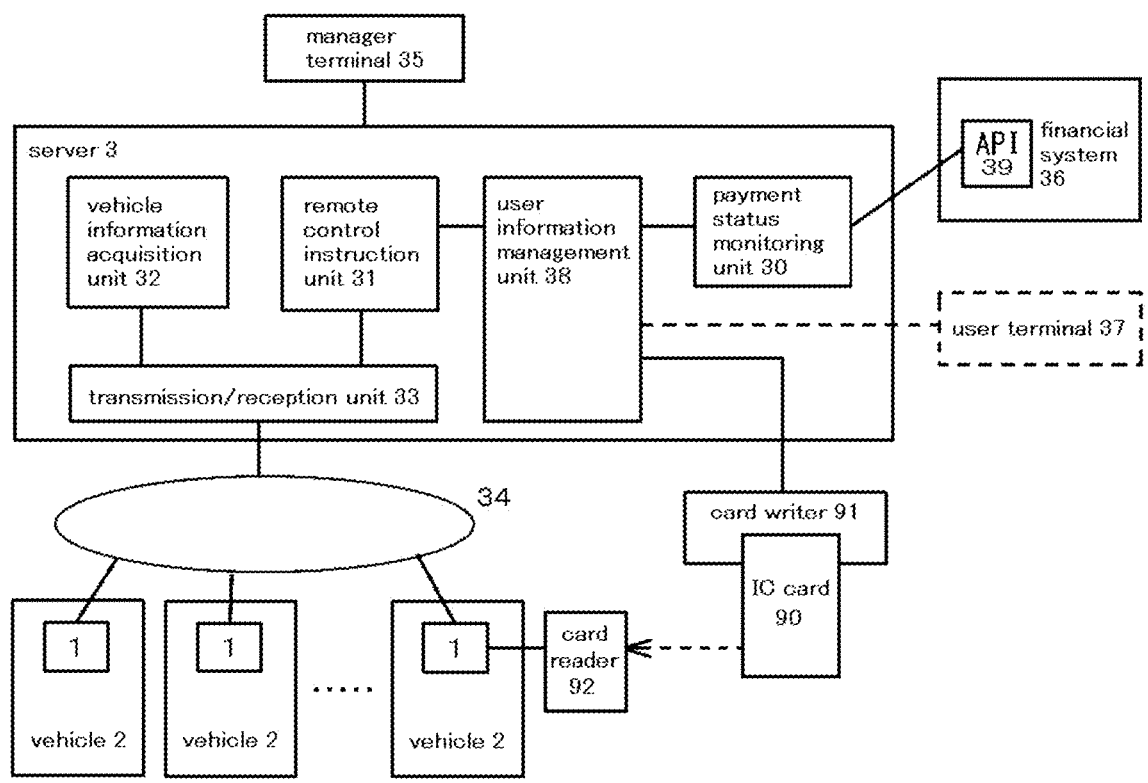

[Fig.13]
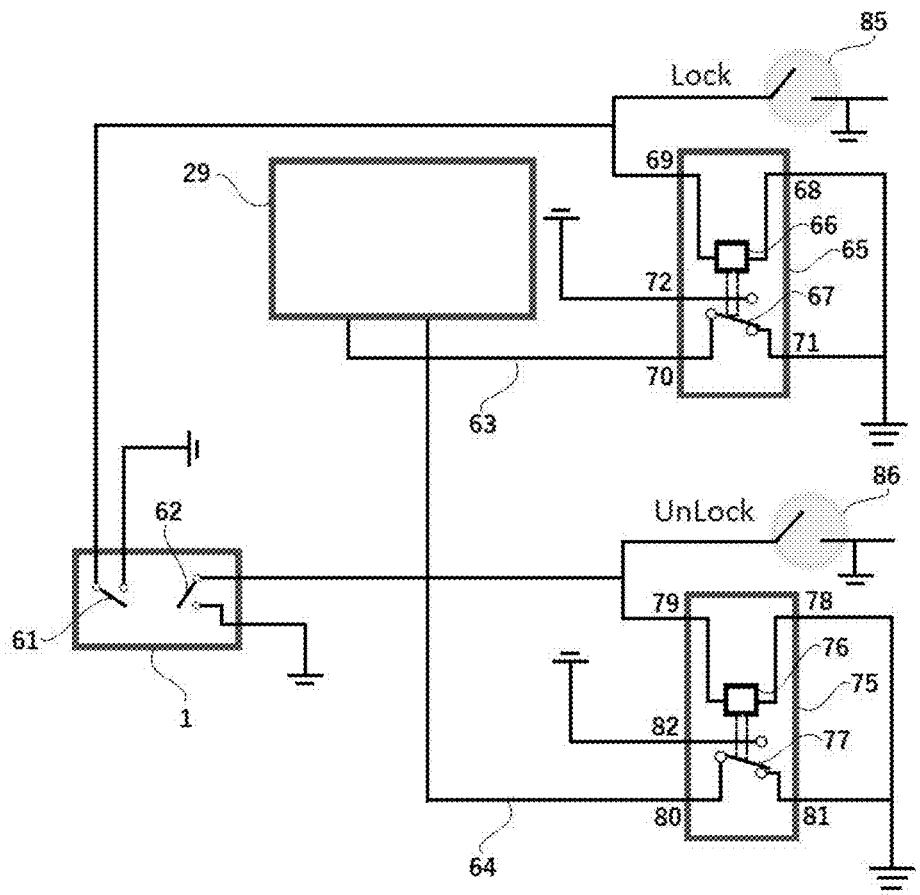
[Fig.14]
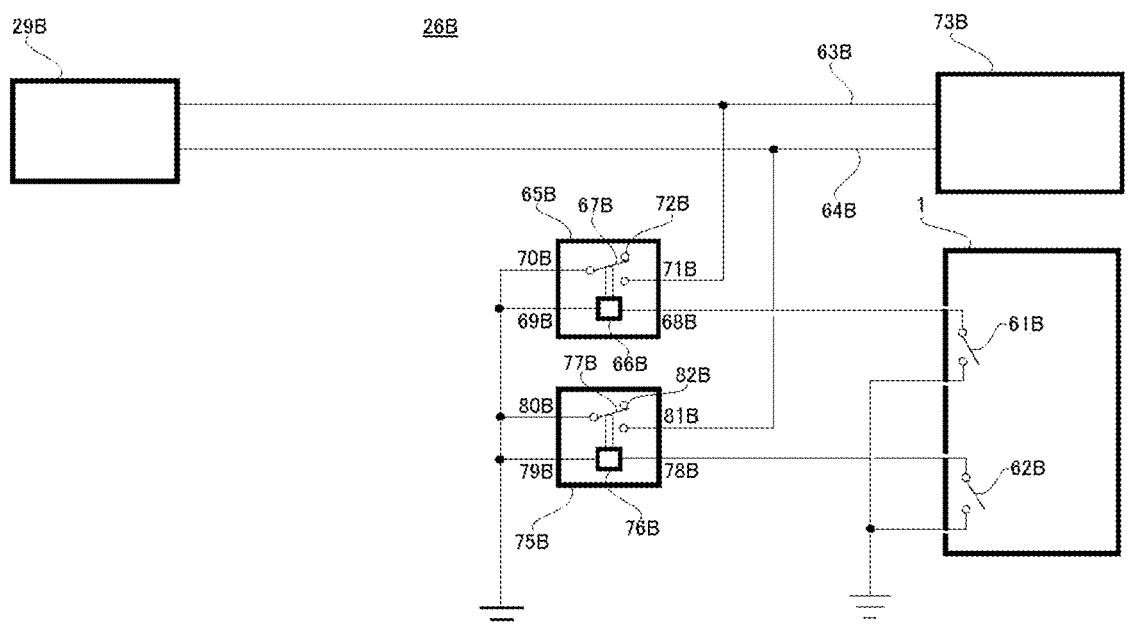

[Fig.15]
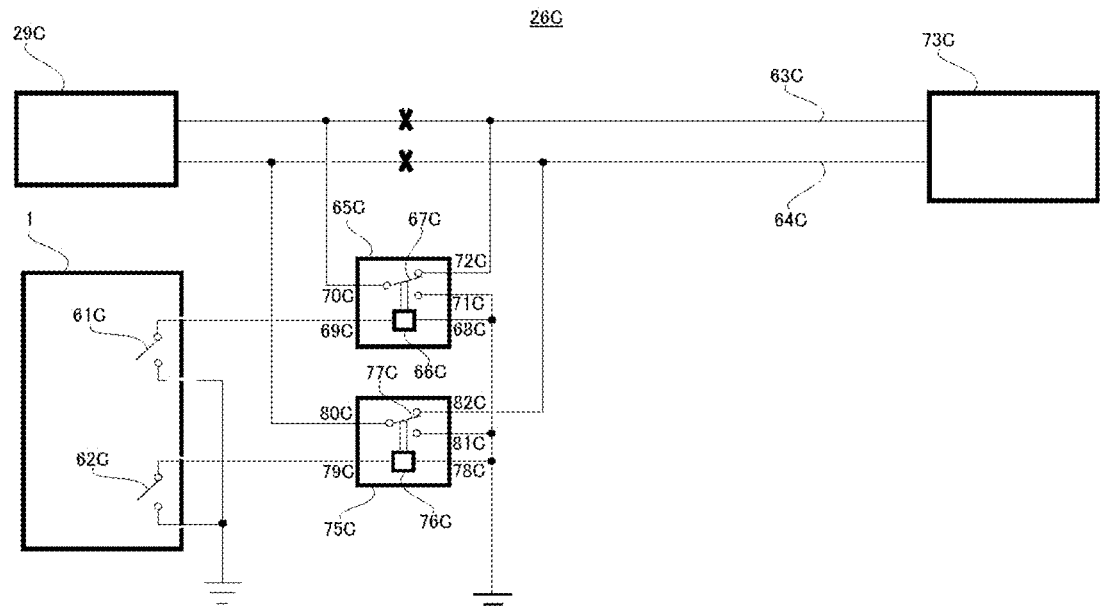
[Fig.16]
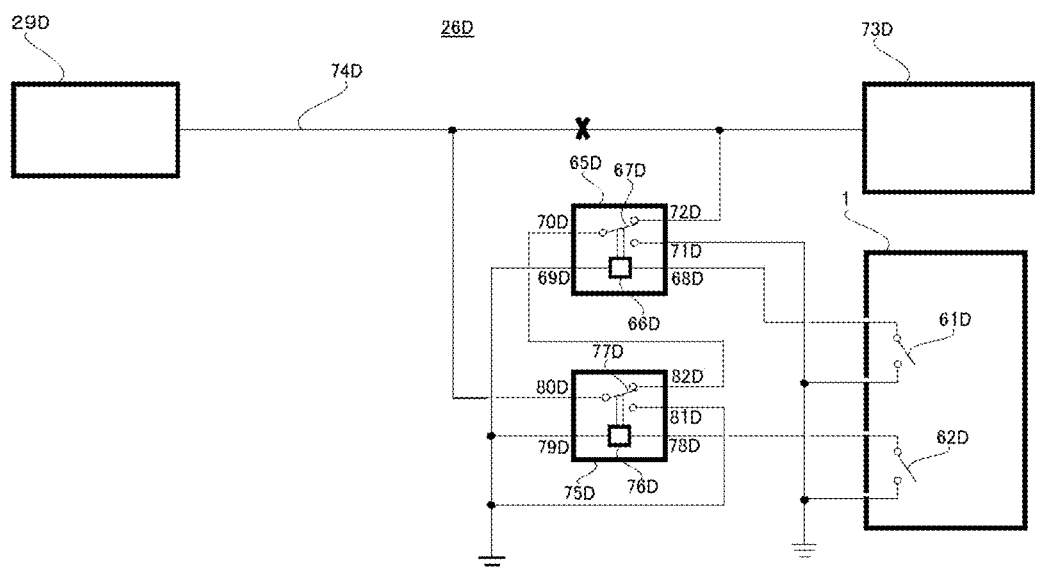

[Fig.17]

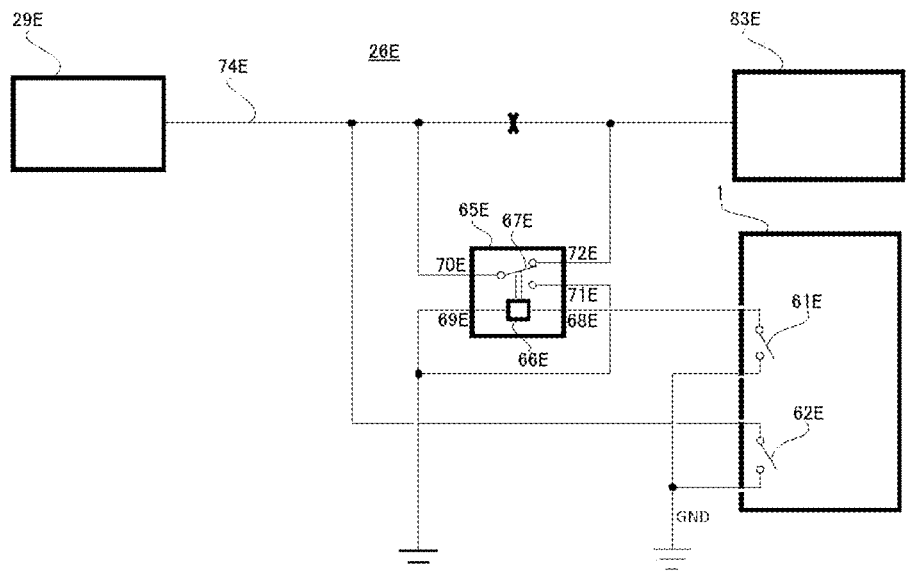

[Fig.18]

| Vehicle type | with immobilizer | | without immobilizer | |
| --- | --- | --- | --- | --- |
| | key type | push type | key type | push type |
| internal combustion engine vehicle | A / B | A / B / C | A | A / C |
| EV | not exist | B / C | not exist | C |
| parallel HEV | B | B / C | no supporting mehod | C |
| series HEV | B | B / C | no supporting mehod | C |
| series-parallel HEV | B | B / C | no supporting mehod | C |

A: cut ST line
B: disable key authentication
C: invalidate push button

VEHICLE STARTING CONTROL SYSTEM, VEHICLE-MOUNTED DEVICE, VEHICLE, SERVER, VEHICLE STARTING METHOD, VEHICLE STARTING PROGRAM AND STORAGE MEDIUM

RELATED APPLICATIONS

The present application is a National Phase of International Application No. PCT/JP2018/011227 filed Mar. 20, 2018.

TECHNICAL FIELD

The present invention relates to a vehicle starting control system, a vehicle-mounted device, a vehicle, a server, a vehicle starting method, a vehicle starting program and a storage medium for use in services that provide a vehicle equipped with a vehicle-mounted device.

BACKGROUND ART

In the conventional automobile distribution and leasing industry, people have been unable to obtain vehicles without passing strict finance credit screening. Nowadays, a service has been proposed to users who have the ability to pay but fail to pass a conventional credit screening. This service eliminates credit screening but provides a vehicle and, if the charge (for example, monthly fee) is not paid within a predetermined time limit, remotely stops the vehicle and specifies the vehicle position for vehicle retrieval. In such a service, a vehicle, which has been temporarily stopped due to non-payment of the charge, is made available again after the payment, and the user can use the vehicle again.

An example of a system for implementing such a service is disclosed in Patent Literature 1, in which a vehicle is equipped with a vehicle-mounted device with a remote control function, and this vehicle-mounted device is connected to a network so that a server remotely controls the vehicle or a server acquires information on the vehicle. Such a vehicle connected to a network is called a "connected car". In this system, if the user does not pay the charge within a predetermined time limit, when certain conditions such as that the engine of the vehicle is not started are satisfied, the start of the vehicle is restricted by a command from the server. Then, when it is confirmed that the user has paid the charge after the starting restriction, the remote control for releasing the vehicle starting restriction is executed by a command from the server. By releasing this starting restriction, the user can use the vehicle again.

Also in Patent Literature 2, a system is disclosed, in which a vehicle is equipped with a vehicle-mounted device with a remote control function, and this vehicle-mounted device is connected to a network so that a server remotely controls the vehicle or a server acquires information on the vehicle. In this system, if the user does not pay the charge within a predetermined time limit, when certain conditions are satisfied, the start of the vehicle is restricted by a command from the server. The certain conditions include that a predetermined time has passed since the engine of the vehicle was turned off. Then, when it is confirmed that the user has paid the charge after the starting restriction, as in the case of Patent Literature 1, the remote control for releasing the vehicle starting restriction is executed by a command from the server. By releasing this starting restriction, the user can use the vehicle again.

CITATION LIST

Patent Literature

Patent Literature 1: WO2016/167350A1
Patent Literature 2: Japanese Patent Application No. 6238038

SUMMARY OF INVENTION

Technical Problem

In both of the systems of Patent Literature 1 and Patent Literature 2, when it is confirmed that the user has paid the charge after the starting restriction, the remote control for releasing the vehicle starting restriction is executed by a command from the server. However, it takes time from the user payment of the charge (for a financial institution) via a financial system after the starting restriction to the issue of a command for releasing the starting restriction from the server after the confirmation of the payment.

Furthermore, even if the server issues a command for releasing the starting restriction, in a case where the vehicle-mounted device is in the sleep state, a predetermined time until the starting is required. Furthermore, even if the server issues a command for releasing the starting restriction, in a case where radio wave condition is poor and the command for releasing the starting control from the server does not reach the vehicle-mounted device, the vehicle starting restriction cannot be released.

Therefore, for users who want to use the vehicle immediately, there is a problem of the time lag from the payment of the charge to the actual release of the vehicle starting restriction. For example, if the vehicle is a private taxi, there is a high demand for taxi drivers who want to immediately start business with the taxi. Therefore, the time lag from the payment of the charge to the actual release of the vehicle starting restriction is an important problem for taxi drivers.

Further, in the fields of car sharing and car rental, in a case where the use of a vehicle is permitted after the payment of the charge, there is also a problem that there is a time lag from the payment of the charge to the actual release of the vehicle starting restrictions. Further, for the vehicle starting control, there is also a problem in managing the vehicle key.

In view of the problems of Patent Literature 1 and Patent Literature 2 as described above, a problem of the present application is to provide a vehicle starting control system, a vehicle-mounted device, a vehicle, a server, a vehicle starting method, a vehicle starting program, and a storage medium that can shorten the time lag from the user payment of the charge to the release of vehicle starting restriction.

Another object of the present application is to provide a vehicle starting control system, a vehicle-mounted device, a vehicle, a server, a vehicle starting method, a vehicle starting program, and a storage medium that can shorten the time lag from the user payment of the charge to the confirmation of the payment in the server by linking with a financial system.

Another problem of the present application is to provide a vehicle starting control system, a vehicle-mounted device, a vehicle, a server, a vehicle starting method, a vehicle starting program, and a storage medium that can release the vehicle starting restriction even in a poor radio wave condition Another problem of the present application is to provide a vehicle starting control system, a vehicle-mounted device, a vehicle, a server, a vehicle starting method, a vehicle starting program, and a storage medium that can release the vehicle starting restriction even when the vehicle-mounted device is in the sleep state.

Further, another problem of the present application is to provide a vehicle starting control system, a vehicle-mounted device, a vehicle, a server, a vehicle starting method, a vehicle starting program, and a storage medium in which vehicle keys can be easily managed.

Solution to Problem

The above objects of the present invention can be achieved by the following configurations. That is to say, a vehicle starting control system of the first aspect of the present invention comprises:

a server for managing a starting state of a vehicle; and a vehicle-mounted device for controlling the starting state of the vehicle based on a control command for controlling the starting state of the vehicle provided from the server and characterized in that the server is accessibly connected to a financial system and can monitor a status of payment of a predetermined charge for the vehicle via the financial system, and when the payment of the predetermined charge for the vehicle is detected, the server can control the starting state of the vehicle by providing the vehicle-mounted device with the control command for controlling the starting state of the vehicle via at least one of a communication means, a mobile terminal, and an IC card.

Further, a vehicle starting control system of the second aspect of the present invention is characterized in that, in the vehicle starting control system of the first aspect, the server is connected to the financial system via a predetermined interface included in the financial system.

Further, a vehicle starting control system of the third aspect of the present invention is characterized in that, in the vehicle starting control system of the first or second aspect, the server can communicate the control command for controlling the starting state of the vehicle with at least one of
(1) the vehicle-mounted device,
(2) the mobile terminal, and
(3) the IC card.

Further, a vehicle starting control system of the fourth aspect of the present invention is characterized in that, in the vehicle starting control system of any one of the first to third aspect, the mobile terminal and/or the IC card can communicate the control command for controlling the starting state of the vehicle with the vehicle-mounted device.

Further, a vehicle starting control system of the fifth aspect of the present invention is characterized in that, in the vehicle starting control system of any one of the first to fourth aspect, the control command for controlling the starting state of the vehicle provided from the server includes authentication information used for the vehicle-mounted device.

Further, a vehicle starting control system of the sixth aspect of the present invention is characterized in that, in the vehicle starting control system of any one of the first to fifth aspect, the starting state to be controlled of the vehicle includes at least one of a door lock state of the vehicle, an engine starting state of the vehicle, a state of an immobilizer of the vehicle, and a state of a push button for starting the vehicle.

Further, a vehicle-mounted device of the seventh aspect of the present invention controls a starting state of a vehicle based on a control command for controlling the starting state of the vehicle provided from a server for managing the starting state of the vehicle and is characterized in that the server is accessibly connected to a financial system and can monitor a status of payment of a predetermined charge for the vehicle via the financial system, and when the payment of the predetermined charge for the vehicle is detected, the server can control the starting state of the vehicle by providing the vehicle-mounted device with the control command for controlling the starting state of the vehicle via at least one of a communication means, a mobile terminal, and an IC card.

Further, a vehicle-mounted device of the eighth aspect of the present invention is characterized in that, in the vehicle-mounted device of the seventh aspect, the control command for controlling the starting state of the vehicle includes a relay control command, the vehicle-mounted device includes a vehicle information-associated control means for controlling an engine starting external relay based on the relay control command, and the vehicle information-associated control means determines whether or not to adopt the relay control command according to a situation of the vehicle.

Further, a vehicle-mounted device of the ninth aspect of the present invention is characterized in that, in the vehicle-mounted device of the seventh or eighth aspect, the vehicle-mounted device includes at least one internal relay connected to wiring existing in the vehicle between a door key switch existing in the vehicle and a door lock actuator existing in the vehicle, and the internal relay controls locking or unlocking of a door lock existing in the vehicle by controlling at least one external relay.

Further, a vehicle of the tenth aspect of the present invention is characterized in that the vehicle includes the vehicle-mounted device of any one of the seventh to ninth aspect.

Further, a vehicle starting control system of the eleventh aspect of the present invention is characterized in that the vehicle starting control system includes the vehicle-mounted device of any one of the seventh to ninth aspect.

Further, a server of the twelfth aspect of the present invention provides a vehicle-mounted device for controlling a starting state of a vehicle with a control command for controlling the starting state of the vehicle and manages the starting state of the vehicle and is characterized in that the server is accessibly connected to a financial system and can monitor a status of payment of a predetermined charge for the vehicle via the financial system, and when the payment of the predetermined charge for the vehicle is detected, the server can control the starting state of the vehicle by providing the vehicle-mounted device with the control command for controlling the starting state of the vehicle via at least one of a communication means, a mobile terminal, and an IC card.

Further, a vehicle starting method of the thirteenth aspect of the present invention is characterized in that the method comprises:

a means for managing a starting state of a vehicle and controlling the starting state of the vehicle based on a control command for controlling the starting state of the vehicle;

a means, which is accessibly connected to a financial system, for monitoring a status of payment of a predetermined charge for the vehicle via the financial system; and a means for providing a vehicle-mounted device with the control command for controlling the starting state of the vehicle via at least one of a communication means, a mobile terminal, and an IC card when the payment of the predetermined charge for the vehicle is detected, and the method can control the starting state of the vehicle.

Further, a vehicle starting program of the fourteenth aspect of the present invention is characterized in that the vehicle starting program is capable of executing the vehicle starting method of the thirteenth aspect.

Further, a storage medium of the fifteenth aspect of the present invention is characterized in that the storage medium stores the vehicle starting program of the fourteenth aspect.

Advantageous Effects of Invention

According to the vehicle starting control system of the first aspect, it is possible to shorten the time lag from the user payment of the charge to the release of vehicle starting restriction. Further, when the payment of the predetermined charge for the vehicle is detected, the server can provides the vehicle-mounted device with the control command for controlling the starting state of the vehicle via at least one of a communication means, a mobile terminal, and an IC card. Thus, multiple types of media can be prepared to provide the control command for the vehicle-mounted device from the server. Therefore, it is possible to provide a highly convenient system for users, and the vehicle starting restriction can be released even in a poor radio wave condition or even when the vehicle-mounted device is in the sleep state.

According to the vehicle starting control system of the second aspect, by linking with the financial system, the status of payment of the predetermined charge can be instantly monitored. Therefore, it is possible to provide a vehicle starting control system that can shorten the time lag from the user payment of the charge to the confirmation of the payment in the server.

According to the vehicle starting control system of the third aspect, a plurality of means for communicating the control command for controlling the starting state of the vehicle with the server are provided. Thus, the locking and unlocking operation of the door lock and the vehicle starting operation can be controlled by a means convenient for users. Therefore, it is possible to provide a highly convenient system for users and vehicle keys can be easily managed. Further, the vehicle starting restriction can be released even in a poor radio wave condition or even when the vehicle-mounted device is in the sleep state. Therefore, it is possible to provide a vehicle starting control system that can shorten the time lag from the confirmation of user payment to the release of vehicle starting restriction.

According to the vehicle starting control system of the fourth aspect, the vehicle starting operation can be controlled using the mobile terminal and/or the IC card. Therefore, by using the mobile terminal and/or the IC card, the vehicle starting restriction can be released even in a poor radio wave condition or even when the vehicle-mounted device is in the sleep state.

According to the vehicle starting control system of the fifth aspect, the control command includes authentication information used for the vehicle-mounted device. Therefore, by using the authentication information in the vehicle-mounted device, the control command can be collated.

According to the vehicle starting control system of the sixth aspect, it is at least possible to control the unlocking and locking of the door lock of the vehicle or control the engine starting-enabled state and the engine starting-disabled state of the vehicle.

According to the vehicle-mounted device of the seventh aspect, it is possible to provide a vehicle-mounted device that shortens the time lag from the user payment of the charge to the release of vehicle starting restriction. Further, when the payment of the predetermined charge for the vehicle is detected, the server can provides the vehicle-mounted device with the control command for controlling the starting state of the vehicle via at least one of a communication means, a mobile terminal, and an IC card. Thus, multiple types of media can be prepared to provide the control command for the vehicle-mounted device from the server. Therefore, it is possible to provide a highly convenient vehicle-mounted device for users, and the vehicle starting restriction can be released even in a poor radio wave condition or even when the vehicle-mounted device is in the sleep state.

According to the vehicle-mounted device of the eighth aspect, the vehicle starting operation can be controlled by controlling the engine starting external relay according to the vehicle situation.

According to the vehicle-mounted device of the ninth aspect, it is possible to control locking or unlocking of the door lock for various types of door lock systems.

According to the vehicle of the tenth aspect, it is possible to provide the vehicle achieving the same effects as in the vehicle-mounted device of the seventh to ninth aspects.

According to the vehicle starting control system of the eleventh aspect, it is possible to provide the vehicle starting control system achieving the same effects as in the vehicle-mounted device of the seventh to ninth aspects.

According to the server of the twelfth aspect, it is possible to provide a server that shortens the time lag from the user payment of the charge to the release of vehicle starting restriction. Further, when the payment of the predetermined charge for the vehicle is detected, the server can provides the vehicle-mounted device with the control command for controlling the starting state of the vehicle via at least one of a communication means, a mobile terminal, and an IC card. Thus, multiple types of media can be prepared to provide the control command for the vehicle-mounted device from the server. Therefore, it is possible to provide a highly convenient server for users, and the vehicle starting restriction can be released even in a poor radio wave condition or even when the vehicle-mounted device is in the sleep state.

According to the vehicle starting method of the thirteenth aspect, it is possible to provide a vehicle starting method that shortens the time lag from the user payment of the charge to the release of vehicle starting restriction. Further, when the payment of the predetermined charge for the vehicle is detected, the server can provides the vehicle-mounted device with the control command for controlling the starting state of the vehicle via at least one of a communication means, a mobile terminal, and an IC card. Thus, multiple types of media can be prepared to provide the control command for the vehicle-mounted device from the server. Therefore, it is possible to provide a highly convenient vehicle starting method for users, and the vehicle starting restriction can be released even in a poor radio wave condition or even when the vehicle-mounted device is in the sleep state.

According to the vehicle starting program of the fourteenth aspect, it is possible to provide a vehicle starting program that shortens the time lag from the user payment of the charge to the release of vehicle starting restriction. Further, when the payment of the predetermined charge for the vehicle is detected, the server can provides the vehicle-mounted device with the control command for controlling the starting state of the vehicle via at least one of a communication means, a mobile terminal, and an IC card.

Thus, multiple types of media can be prepared to provide the control command for the vehicle-mounted device from the server. Therefore, it is possible to provide a highly convenient vehicle starting program for users, and the vehicle starting restriction can be released even in a poor radio wave condition or even when the vehicle-mounted device is in the sleep state.

According to the storage medium of the fifteenth aspect, it is possible to provide a storage medium storing a program achieving the effect of the fourteenth aspect.

BRIEF DESCRIPTION OF DRAWINGS

FIG. 1 is an overall diagram of a vehicle starting control system according to the first embodiment.

FIG. 2 is a control flowchart of a server according to the first embodiment.

FIG. 3 is a block diagram of a vehicle-mounted device according to the first embodiment.

FIG. 4 is a wiring diagram of a door lock actuator control circuit according to the first embodiment.

FIGS. 5A and 5B are illustration diagrams of relay values, in which FIG. 5A illustrates a case of a vehicle having one starting control line and FIG. 5B illustrates a case of a vehicle having two starting control lines.

FIG. 6 is an illustration diagram of wiring of a relay.

FIG. 7 is an illustration diagram of a configuration in a memory.

FIG. 8 is a flowchart of a relay control unit.

FIG. 9 is a flowchart of a relay monitoring unit.

FIG. 10 is a flowchart of an engine-associated control unit.

FIG. 11 is an overall diagram of a vehicle starting control system according to the second embodiment.

FIG. 12 is an overall diagram of a vehicle starting control system according to the third embodiment.

FIG. 13 is a wiring diagram of a door lock actuator control circuit according to the fourth embodiment.

FIG. 14 is a wiring diagram of a door lock actuator control circuit according to the fifth embodiment.

FIG. 15 is a wiring diagram of a door lock actuator control circuit according to the sixth embodiment.

FIG. 16 is a wiring diagram of a door lock actuator control circuit according to the seventh embodiment.

FIG. 17 is a wiring diagram of a door lock actuator control circuit according to the eighth embodiment.

FIG. 18 is an explanatory diagram of a starting-disabled state for each vehicle type.

DESCRIPTION OF EMODIMENTS

Hereinafter, a vehicle starting control system, a vehicle-mounted device, a vehicle, a server, a vehicle starting method, a vehicle starting program, and a storage medium according to embodiments of the present invention will be described with reference to the drawings. However, each embodiment described below is merely an example of a vehicle starting control system, a vehicle-mounted device, a vehicle, a server, a vehicle starting method, a vehicle starting program, and a storage medium for embodying the technical concept of the present invention. The present invention is not limited to these embodiments, but is equally applicable to other embodiments within the scope of the claims.

First Embodiment

A vehicle starting control system, a vehicle-mounted device, a vehicle, a server, a vehicle starting method, a vehicle starting program, and a storage medium according to the first embodiment of the present invention will be described with reference to FIGS. 1 to 10.

FIG. 1 is an overall diagram including a vehicle starting control system. In the present embodiment, first, car lease will be described, but the present invention is not limited to this application, and is applicable to applications that controls the starting state of a vehicle, for example, car rental or car sharing. The starting state to be controlled of the vehicle includes at least one of the door lock state of the vehicle, the engine starting state of the vehicle, the state of the immobilizer of the vehicle, and the state of a push button for starting the vehicle. For example, the unlocking and locking operation of the door lock of the vehicle and switching operation of the starting-enabled state and the starting-disabled state of the vehicle are included. When this system is applied to car lease, the vehicle is provided to the user, and if the user does not pay the charge (for example, monthly fee) within a predetermined time limit, the vehicle is stopped remotely (starting-disabled state). In addition, it is possible to realize a service that specifies the vehicle position and collects the vehicle. FIG. 1 illustrates a vehicle 2 that is provided to the user, a vehicle-mounted device 1 that is installed in the vehicle 2, a server 3 for communicating with the vehicle-mounted device 1 to manage locking and unlocking of each vehicle and for communicating with a user terminal 37 to manage reservations of the vehicle. In addition, when applied to car rental or car sharing, a service in which the vehicle is remotely stopped (starting-disabled state) and that specifies the vehicle position and collects the vehicle is realized in such a case where a specific vehicle is used without prior reservation, where there is a problem with payment for the reservation, where the specific vehicle is used for a predetermined period of time beyond the reservation period without prior extension procedure, where the geographical range in which the specific vehicle is used exceeds the range set at the time of reservation, or where the usage mode of the specific vehicle set at the reservation time is violated.

One vehicle-mounted device 1 is installed on one vehicle. The vehicle-mounted device 1 may be installed in any place in the vehicle 2 as long as the vehicle-mounted device 1 can control the vehicle 2 as described later. When the vehicle-mounted device 1 is an add-on part, it can be installed at a place easy to access for installation such as under the passenger's seat. In terms of the antitheft purpose, it can be disposed at a place difficult to access for removal of the vehicle-mounted device 1, for example, in the lower portion of the engine compartment or the inside of the instrument panel. Alternatively, the vehicle-mounted device 1 may be built in beforehand during manufacturing of the vehicle 2. The vehicle-mounted device 1 transmits the vehicle information on the vehicle 2 acquired by a vehicle information detecting means to the server through a wireless communication network 34 and receives a locking command, an unlocking command, and an engine starting relay control signal from the server 3 through the wireless communication network 34 to control a door lock actuator 29 and an engine starting external relay 20 (see FIG. 3) for the vehicle 2 as described later. By controlling the door lock actuator 29, the locking and unlocking of the door lock of the vehicle can be remotely controlled via the server 3 based on the locking and unlocking commands from the user terminal.

Further, by controlling the engine starting external relay 20, it is possible to switch the engine starting state of the vehicle between the starting-disabled state and the starting-enabled state. Note that the locking command, the unlocking command and the engine starting relay control signal can include authentication information used for the vehicle-mounted device, and this authentication information can be used for authentication in the vehicle-mounted device 1. When this authentication information is appropriate, the locking command, the unlocking command, and the engine starting relay control signal are accepted in the vehicle-mounted device 1. In the case of an internal combustion engine vehicle, the engine cannot be started in the starting-disabled state (this means that it prohibits the restart of the engine rather than it does not turn off the running engine), and in the starting-enabled state, the engine can be started. Here, the wireless communication network 34 may be any forms as long as communication between the vehicle-mounted device 1 and the server 3 is possible, for example, 2G, 3G, 4G, 5G, Wi-Fi (registered trademark), WiMAX. (registered trademark), wireless LAN, beacon, Bluetooth (registered trademark), ZigBee (registered trademark) and the like are included.

The server 3 includes a user information management unit 38, a payment status monitoring unit 30, a remote control instruction unit 31, a vehicle information acquisition unit 32 and a transmission/reception unit 33. The payment status monitoring unit 30 monitors the payment status of the user by using an API (Application Programming Interface) 39 of a financial system 36. According to the IT glossary e-Words, API is a rule that defines the procedure and data format for calling the functions and management data of a computer program (software) from other external programs to use them. When the function that is generally used in other external programs is provided in the form of the platform such as OS and middleware, the API defines the procedure for calling the function of the platform to use it. A developer of an external program can reduce his development load by calling and using each function by using the API. The payment status management unit 30 can monitor the payment status of the user via the financial system 36 in real time by using the API 39 of the financial system 36. Therefore, it is possible to promptly detect that the user has made the predetermined payment. The user information management unit 38 can grasp the payment status of the user in real time monitored by the payment status monitoring unit 30.

In addition, the user information management unit 38 manages the vehicle reservation by communicating with the user terminal 37 in the case of car rental or car sharing, transmits door lock key information to the user terminal 37 according to the reservation status and the payment status and receives a locking command and an unlocking command from the user terminal 37. Further, the remote control instruction unit 31 generates a locking command, an unlocking command and an engine starting relay control command for the vehicle-mounted device 1. The operations in which the user information management unit 38 transmits the door lock key information to the user terminal 37, in which the remote control instruction unit 31 generates an unlocking command for the vehicle-mounted device 1, and in which the engine is set to the starting state by the engine starting relay control command are equivalent to the operation of "switching from the starting-disabled state to the starting-enabled state". The vehicle information acquisition unit 32 acquires vehicle information from the vehicle-mounted device 1. The transmission/reception unit 33 transmits/receives data to/from the vehicle-mounted device. The server 3 is also connected to a manager terminal 35.

The user terminal 37 is preferably a mobile terminal such as a smartphone, a mobile phone, or a tablet terminal, and at least needs to be portable to be also used as a vehicle door lock key as in the second embodiment described later. It is desirable that the vehicle 2 and the user terminal 37 have a GPS function. If the vehicle 2 and the user terminal 37 have the GPS function, the server 3 can grasp the vehicle position by the GPS mounted on the vehicle 2 and the user position by the GPS of the user terminal 37. Therefore, the server 3 can determine whether the locking command and the unlocking command transmitted from the user terminal 37 are valid or invalid. That is to say, if the unlocking command is transmitted from the user terminal 37 when the user terminal 37 is away from the corresponding vehicle 2, the server 3 determines that the unlocking command is invalid and does not transmit unlocking command to the corresponding vehicle 2. On the other hand, if the unlocking command is transmitted from the user terminal 37 when the user terminal 37 is near from the corresponding vehicle 2, the server 3 determines that the unlocking command is valid and transmits the unlocking command to the corresponding vehicle 2. Here, the distance between the vehicle 2 and the user terminal 37 is detected by the GPS function provided in the vehicle 2 and the user terminal 37, but needless to say, the distance between the vehicle 2 and the user terminal 37 may be detected by other configurations. For example, if the user terminal 37 and the vehicle-mounted device 1 are each equipped with a specific short-range wireless communication transmission/reception device, the distance between the user terminal 37 and the reserved vehicle 2 can be detected depending on whether or not it is within the area of short-range wireless communication from the user terminal 37 to the vehicle-mounted device 1. Examples of this short-range wireless communication include Bluetooth (registered trademark), ZigBee (registered trademark), infrared communication, RFID (Radio Frequency Identifier), NFC (Near Field Communication), and the like, but the present invention is not limited thereto and includes any type of short-range wireless communication.

Also in a case where a vehicle is reserved from a home PC, if the smartphone receives the door lock key information, it is possible to use the smartphone to transmit the locking command and the unlocking command to the corresponding vehicle. For this reason, in the present invention, the user terminal 37 is not limited to one mobile terminal, and any of a plurality of mobile terminals such as a smartphone and a tablet terminal can transmit a locking command and an unlocking command to a specific vehicle. In this way, various forms of mobile terminals are included in the present invention.

The payment status monitoring unit 30 can monitor the payment status of the user in real time by using the API 39 of the financial system 36. However, the payment status monitoring unit 30 may be directly provided with a function for grasping the payment status of the user.

The transmission/reception unit 33 performs wireless communication with the plurality of vehicle-mounted devices 1 through the wireless communication network 34. In FIG. 1, the communication by the wireless communication network 34 and the communication between the user information management unit 38 and the user terminals 37 are illustrated separately, but communication between the user information management unit 38 and the user terminals 37 may be performed by the wireless communication network 34. That is to say, the communication between the user information management unit 38 and the user terminal 37 also includes, for example, 2G, 3G, 4G, 5G, Wi-Fi (registered trademark), WiMAX (registered trademark), a wireless LAN, a beacon, and Bluetooth (registered trademark), ZigBee (registered trademark) and the like.

The manager terminal 35 includes a display means such as a display for presenting information to the manager and an information input means for inputting information from the manager. Examples of the manager terminal 35 include a PC, a tablet terminal, and a mobile terminal. A touch panel display, a keyboard, a mouse, and the like can be used as the information input means. When a touch panel display is used, a separate keyboard can be omitted.

The server 3 can grasp the vehicle operation status from the vehicle information periodically received from the vehicle-mounted device 1. Preferably, the vehicle information includes the situation of the vehicle door lock, on/off information on the power of the vehicle, power supply input detection information, the state of the engine starting external relay, and GPS position information on the vehicle. The server 3 grasps the vehicle operation status to determine, as necessary, whether the vehicle is parked at a predetermined parking area, whether the vehicle is parked at a place other than a predetermined parking area, whether the user is moving using the vehicle, or whether there is a possibility that the vehicle has been stolen.

Determinations such as determination whether the specific vehicle is used without prior reservation, whether there is a problem with payment for the reservation, whether the specific vehicle is used for a predetermined period of time beyond the reservation period without prior extension procedure, whether the geographic range in which the specific vehicle is used exceeds the range set at the time of reservation, whether the usage mode of the specific vehicle set at the reservation time is violated, whether each user paid the predetermined charge within the predetermined period, whether to change the corresponding vehicle to the starting-disabled state, vehicle operation status described below, or whether to make inquiries to the user and report to the police when the theft or abnormality described below occurs may be automatically made by the server 3, or a part or all of them may be manually made by an manager as necessary. If it is automated by the server 3, the burden on the manager can be reduced. On the other hand, if the manager manually makes some or all of these determinations, it is not necessary for the server 3 to make complicated condition determination, and therefore the configuration of the server 3 can be simplified.

Next, a method of automatically determining the vehicle operation status by the server 3 will be described in detail. In the case of car rental or car sharing, the parking lot where the user receives and returns the vehicle is registered in advance from a plurality of business offices (manned or unmanned parking lots, etc.). Also in the case of car lease, the user has previously registered the parking lot that he mainly uses. When the power of the vehicle is in the off state for a predetermined time or longer at a place equivalent to a parking area registered in advance, it is determined that the vehicle is parked at a predetermined parking area. When the power of the vehicle is in the off state for a predetermined time or longer at a place other than the parking area registered in advance, it is determined that the vehicle is parked at a place other than the predetermined parking area. When the vehicle is at a place other than the parking area registered in advance and the power of the vehicle is not in the off state for a predetermined time or longer, it is determined that the user is moving using the vehicle.

When the vehicle is out of the range registered in advance by the user for a predetermined period or longer, it is determined that there is a possibility that the vehicle has been stolen. If it is determined that there is a possibility that the vehicle has been stolen, the contact registered in advance by the user is notified of the vehicle operation status, and an inquiry is made as to whether a theft has occurred. If there is no reply from the user within a predetermined time limit or if there is a reply indicating theft from the user, a notification of theft is given to the manager, and an engine starting relay control command corresponding to the starting-disabled state is transmitted to the vehicle-mounted device 1. If the manager receives a notification of theft from the server 3, the manager makes contact with the user to check on the occurrence of theft and then reports the vehicle theft to the police if necessary.

The vehicle-mounted device 1 further includes a means for detecting an abnormality such as removal of the vehicle-mounted device 1 from the vehicle 2 or cutting-off or removal of wiring connected to the vehicle-mounted device 1. When such an abnormality is detected, the vehicle-mounted device 1 notifies the server 3 of the occurrence of the abnormality. When this notification is given, the server 3 promptly gives a notification to the manager. When receiving the notification of abnormality from the server 3, the manager makes contact with the user to check on the occurrence of theft and then reports the vehicle theft to the police if necessary.

Examples of possible cases where the vehicle-mounted device 1 has been removed from the vehicle 2 include (1) theft by a thief, (2) misuse of the vehicle by the user, and (3) use of the vehicle in an unavoidable and urgent case by the user who has not paid. When the vehicle-mounted device 1 has been removed from the vehicle 2, in cases where theft and misuse as in (1) and (2) are always assumed, it is desirable to set the vehicle to the starting-disabled state. On the other hand, when the vehicle-mounted device 1 has been removed from the vehicle 2 in the urgent case as in (3), for example, when an emergency patient is to be transported, it is desirable to set the vehicle to the starting-enabled state. As will be described later, the engine starting external relay 20 can switch its connection to select a mode of setting the starting-disabled state or a mode of setting the starting-enabled state when the wiring is cut off or removed. Accordingly, the engine starting external relay 20 is preset to enter the starting-disabled state if the vehicle-mounted device 1 detects the abnormality or if the manager assumes theft and misuse as in (1) and (2) when the wiring of the engine starting external relay 20 is cut off or removed, whereas the engine starting external relay 20 is preset to enter the starting-enabled state if the manager assumes an urgent case as in the case (3).

In the case of car lease, an example of the flowchart of monitoring the payment in the server 3 and switching control between the starting-enabled state and the starting-disabled state will be described with reference to FIG. 2. The flowchart starts in A1. In A2, the engine starting external relay 20 of the vehicle is set to the starting-enabled state so that the vehicle can be started when the vehicle is delivered (at the time of shipment). In A3, the payment status monitoring unit 30 monitors the payment status of the user in real time by using the API 39 of the financial system 36, and in A4, whether or not the user of each vehicle paid the charge within a predetermined period (whether or not there is delinquency) is determined. If the charge has not been paid within the predetermined period (Yes in A4), the process proceeds to A5. In A5, since the user has not paid the charge, the user is warned that the vehicle would be switched to the starting-disabled state unless the charge is paid within a predetermined period, and the process proceeds to A6. If No is selected in A4, the process returns to A3.

In A6, the payment status monitoring unit 30 monitors the payment status of the user in real time by using the API 39 of the financial system 36, and in A7, whether or not the charge has been paid by the user of each vehicle within the predetermined period is determined. If the determination in A7 is No, the process proceeds to A8. In A8, after confirming the vehicle operation status, if the predetermined condition is satisfied, in order to set the corresponding vehicle 2 to the starting disabled state, the server 3 transmits the engine starting relay control command corresponding to the starting-disabled state from the remote control instruction unit 31 to the corresponding vehicle-mounted device 1, and the process proceeds to A9. When the vehicle-mounted device 1 receives the engine starting relay control command corresponding to the starting-disabled state, the engine starting external relay 20 is switched to the starting-disabled state, so that the corresponding vehicle 2 is set to the starting-disabled state. That is to say, in the case of an internal combustion engine vehicle, the engine cannot be started. In the present embodiment, in the case of Yes in A4 (in the case where delinquency is detected), the user is temporarily warned in A5 to switch the vehicle to the starting-disabled state, but the present invention is not limited to this example. For example, in the case of Yes in A4, it is possible to directly proceed to A8 and switch the vehicle to the starting-disabled state. In this way, it will be decided in consideration of local laws and business practices whether or not to proceed directly to A8 when a delinquency is detected and switch the vehicle to the starting-disabled state, or whether to give a warning and give a predetermined grace period before switching the vehicle to the starting-disabled state.

On the other hand, if the determination in A7 is Yes, the process returns to A3, and the payment status monitoring unit 30 uses the API 39 of the financial system 36 to monitor the payment status of the user in real time. When there is no engine starting relay control command from the server 3 to the vehicle-mounted device 1 corresponding to the starting-disabled state, the engine starting external relay 20 is normally set to the starting-enabled state. Therefore, if the charge is paid within a predetermined period (Yes in A7), the engine starting relay control command corresponding to the starting-disabled state is not transmitted from the server 3 to the vehicle-mounted device 1. Thus, the engine starting external relay 20 is still set to the starting-enabled state, and the corresponding vehicle 2 is in the starting-enabled state, that is to say, in the case of an internal combustion engine vehicle, the engine can be started.

In A9, the user is informed that the vehicle is in the starting-disabled state because the charge has not been paid, and the user is designated for a predetermined period of time and is prompted to pay the predetermined charge. Then, the process proceeds to A10. In A10, the payment status monitoring unit 30 monitors the payment status of the user in real time by using the API 39 of the financial system 36, and in A11, whether or not the charge has been paid by the user of the vehicle within the predetermined period is determined. If the determination in A11 is YES (when payment is made), the server 3 transmits the engine starting relay control command corresponding to the starting-enabled state from the remote control instruction unit 31 to the corresponding vehicle-mounted device 1 in order to set the corresponding vehicle to the starting-enabled state again. When the vehicle-mounted device 1 receives the engine starting relay control command corresponding to the starting-enabled state, the engine starting external relay 20 is switched to the starting-enabled state, so that the corresponding vehicle enters the starting-enabled state again.

When the charge is a monthly fee, it is determined whether a predetermined amount of money has been paid, for example, no later than 25th of the previous month (corresponding to A4). If a predetermined amount has not been paid, a message is transmitted to the user to indicate that the user is delinquent and if a predetermined charge fails to be paid within one week, the vehicle will be set to the starting-disabled state (corresponding to A5). If a predetermined charge is not paid within one week from transmission of this message, the server 3 confirms the vehicle operation status and then transmits an engine starting relay control command corresponding to the starting-disabled state from the remote control instruction unit 31 to the corresponding vehicle-mounted device 1 under the condition that a predetermined condition is satisfied (corresponding to A8). If the user does not pay a predetermined fee after the elapse of a predetermined period, for example, one month since the vehicle was set to the starting disabled state (if the determination in A11 is No), the manager uses the position information of the specific vehicle acquired by the vehicle information acquisition unit 32 to make an arrangement to retrieve the vehicle (corresponding to A14, and thereafter ends in A15 and ends the process).

On the other hand, if the deposit of a predetermined amount of money by the user is confirmed within a predetermined time limit after the engine starting relay control command corresponding to the starting-disabled state is transmitted to the vehicle-mounted device 1 (if the determination in A11 is yes), the server 3 transmits an engine starting relay control command corresponding to the starting-enabled state from the remote control instruction unit 31 to the corresponding vehicle-mounted device 1 and sets the vehicle to the starting-enabled state again (corresponding to A12). In a state in which there is no engine starting relay control command corresponding to the starting-disabled from the server 3 to the vehicle-mounted device 1, the engine starting external relay 20 is usually set to the starting-enabled state, and thus the corresponding vehicle is set in the starting-enabled state. Accordingly, the user can use the vehicle kept in the starting-enabled state as long as the user has paid a predetermined fee no later than 25th every month.

After the vehicle is switched to the starting-disabled state in A8 and the user is prompted to make a predetermined payment in A9, if the user wants to use the vehicle immediately, the user will promptly make the predetermined payment. In this case, since the user wants to use the vehicle immediately, if there is a time lag between the time when the predetermined payment is made and the time when the vehicle is actually switched from the starting-disabled state to the starting-enabled state, it is disadvantageous and problematic for the user who want to use the vehicle immediately. Thus, in A10, the payment status of the user is monitored in real time by using the API 39 of the financial system 36. Therefore, in A11, it is possible to recognize in real time that the user has made the predetermined payment, and in A12, immediately after the predetermined payment is made, the server 3 transmits an engine starting relay control command corresponding to the starting-enabled state from the remote control instruction unit 31 to the corresponding vehicle-mounted device 1, and again sets the vehicle to the starting-enabled state. The process returns at A13.

The present invention is not limited to the case of car lease, and can also be applied to, for example, car sharing or car rental. In those cases, the present invention can be applied to, for example, control of locking and unlocking of a door lock key, or control of switching between vehicle starting-enabled state and vehicle starting-enabled state by the engine starting relay control command. For example, in the case of car sharing or car rental, when the user makes a reservation for a specific vehicle from the user terminal 37 to the user information management unit 38 of the server 3, after the payment procedure for the charge such as internet banking and card payment is completed, the user information management unit 38 transmits door lock key information to the user terminal 37. The user can control the unlocking and locking of the vehicle door lock via the server 3 using this door lock key information. Further, the server 3 can control switching between the starting-enabled state and the starting-disabled state of the vehicle 2 according to the payment status of the user, the status of the vehicle and the like. Also in this case, by monitoring the payment status of the user in real time by using the API 39 of the financial system 36, the server can recognize in real time that the user has made a predetermined payment. Therefore, it is possible to shorten the time lag from the user payment of the charge to the release of the vehicle starting restrictions (for example, the door lock is unlocked, or the vehicle 2 is switched to a starting-enabled state).

The configuration of the vehicle-mounted device 1 and the connection to the vehicle 2 is now described with reference to FIG. 3. FIG. 3 is a block diagram of the vehicle-mounted device, illustrating an example of connection to an internal combustion engine vehicle. The same configuration as in FIGS. 1 and 2 are denoted with the same reference signs and will not be further described.

FIG. 3 illustrates a CPU 11 for arithmetic operations, a wireless communication module 12 for communicating by radio with the transmission/reception unit of the server 3 through a wireless communication network, a memory 13 configured, for example, as a nonvolatile memory for storing a state of the engine starting relay, a console input/output 14 which is an input/output unit of the console for making a variety of settings for the vehicle-mounted device, an internal battery 15 which is a battery inside the vehicle-mounted device to be charged with power from an external battery 21 of the vehicle 2, a power supply input detecting unit 16 for detecting power supply input from the external battery 21 of the vehicle 2, an IGN input detecting unit 17 connected to a running state identification line (ACC line, IGN line) 22 of the vehicle 2 for detecting the on/off state of the engine, an engine starting relay input/output 18 connected to the engine starting external relay 20, a GPS input/output unit (GPSI/O in FIG. 3) 19 connected to a GPS 24 of the vehicle 2 for detecting the position information of the vehicle, and an internal relay 25 connected to a door lock actuator control circuit 26 for controlling the door lock actuator 29 via an external relay 28. Although not illustrated, the vehicle-mounted device 1 may include a door lock detection circuit for detecting the situation of the door lock and an acceleration sensor. Furthermore, the vehicle-mounted device 1 may be configured to detect information such as vehicle speed pulse and a fuel sensor. Here, the external battery 21 refers to the term distinguished from the internal battery 15 inside the vehicle-mounted device 1 and means an on-vehicle battery. The engine starting external relay 20 is connected to the engine starting control line (ST line) of the vehicle 2. Although the engine starting external relay 20 is illustrated between the vehicle 2 and the vehicle-mounted device 1 in FIG. 3, the engine starting external relay 20 is actually provided in the inside of the engine compartment of the vehicle 2 and the engine starting external relay 20 is disposed at a place hidden from the outside. The engine starting external relay 20 is thus a structure unable to be removed on purpose by a theft or a user. The engine starting relay input/output 18 detects whether the engine starting external relay 20 is in the starting-disabled state or in the starting-enabled state and performs control such that the engine starting external relay 20 is switched to the starting-disabled state or the starting-enabled state based on an engine starting relay control command.

The power supply input detecting unit 16 is connected with the external battery 21, the IGN input detecting unit 17 is connected with the running state identification line 22, the engine starting relay input/output 18 is connected with the engine starting external relay 20, the GPS input/output unit 19 is connected with the GPS 24, and the internal relay 25 is connected with the door lock actuator circuit 26, each directly with individual wires, not through a vehicle LAN such as CAN. Because a vehicle LAN such as CAN is thus not used, there is no problem of the vulnerability to security risk as is the case in a vehicle LAN such as CAN.

The vehicle-mounted device 1 is driven by electric power of the internal battery 15. The internal battery is always charged with electric power of the external battery 21 of the vehicle 2 and can continuously drive the vehicle-mounted device for a predetermined time even in the event of abnormality such as when the vehicle-mounted device 1 is removed or when the charge line is cut off or removed. For this reason, the server 3 can be notified of the occurrence of abnormality together with the present location information. The latest present location information and other information are stored in the memory 13.

The CPU 11 is connected to the wireless communication module 12, the memory 13, the console input/output 14, the internal battery 15, the power supply input detecting unit 16, the IGN input detecting unit 17, the engine starting relay input/output 18, the GPS input/output unit 19, the internal relay 25, a not-illustrated door lock detecting circuit, and a not-illustrated acceleration sensor. The power supply input detecting unit 16, the IGN input detecting unit 17, the GPS input/output unit 19, the door lock detecting circuit and the acceleration sensor are provided as the vehicle information detecting means. The engine starting relay input/output 18 detects a state of the engine starting external relay 20 and controls the engine starting external relay 20 to one of the starting-disabled state and the starting-enabled state. The state of the engine starting external relay 20 is also usable as the vehicle information.

The door lock actuator control circuit 26 is a circuit including a door key switch 27, the external relay 28 and the door lock actuator 29. The door key switch 27 is a switch that is operated by a mechanical key, a smart key or the like and that controls the door lock actuator 29 to lock and unlock the door lock. The door lock actuator control circuit 26 includes a circuit that can lock and unlock the door lock by controlling the external relay 28 and the door lock actuator 29 by operating the internal relay 25.

<Locking and Locking Operation of Door Lock by Internal Relay and External Relay>

The operation of the internal relay and the external relay will be described with reference to FIG. 4. FIG. 4 is a wiring diagram of the door lock actuator control circuit 26 according to the first embodiment. In this circuit, the door lock is locked or unlocked by connecting a locking line 63 or an unlocking line 64 to the ground. The vehicle-mounted device 1 including the first internal relay 61, which is connected is connected between a door key lock switch 85 and the door lock actuator 29, and the second internal relay

62, which is connected between a door key unlock switch 86 and the door lock actuator 29. By operating the first internal relay 61 and the second internal relay 62 of the vehicle-mounted device 1, the door lock actuator 29 can be controlled via the first external relay 65 and the second external relay 75.

The door lock actuator 29 is, for example, a DC motor capable of forward and reverse rotation, and both ends of the DC motor are connected to the locking line 63 and the unlocking line 64 to which 12V power sources are normally applied. The locking line 63 is connected to a terminal 70 of the first external relay. The unlocking line 64 is connected to a terminal 80 of the second external relay 75. A switching contact 67 connected to the terminal 70 of the first external relay is mechanically biased to a terminal 71 side which is normally connected to the 12V power source. When a coil 66 is energized, the contact 67 is switched to a terminal 72 which is connected to the ground. A terminal 68 at one end of the coil 66 is connected to the 12V power source similarly to the terminal 71. A terminal 69 at the other end of the coil 66 is connected to one end of the door key lock switch 85 which is a normally open switch, and the other end of the door key lock switch 85 is connected to the ground. One end of the door key lock switch 85 is connected to one end of the first internal relay which is a normally open switch, and the other end of the first internal relay 61 is connected to the ground.

A switching contact 77 connected to a terminal 80 of the second external relay is mechanically biased to a terminal 81 side which is normally connected to the 12V power source. When a coil 76 is energized, the contact 77 is switched to a terminal 82 which is connected to the ground. A terminal 78 at one end of the coil 76 is connected to the 12V power source similarly to the terminal 81. A terminal 79 at the other end of the coil 76 is connected to one end of the door key unlock switch 86 which is a normally open switch, and the other end of the door key unlock switch 86 is connected to the ground. One end of the door key unlock switch 86 is connected to one end of the second internal relay which is a normally open switch, and the other end of the second internal relay 62 is connected to the ground.

When an unlocking command is transmitted from the user terminal 37 to the user information management unit 38 and the user information management unit 38 determines that the unlocking command from the user terminal 37 is valid, a door lock unlocking command for transmitting an unlocking command to the specific vehicle 2 is transmitted to the remote control instruction unit 31. Upon receiving the door lock unlocking command from the user information management unit 38, the remote control instruction unit 31 transmits the unlocking command to the specific reserved vehicle 2. In the vehicle-mounted device 1, when the unlocking command is received from the remote control instruction unit 31, the second internal relay 62, which is a normally open switch, is conductively controlled for a predetermined time (for example, about 0.1 to 0.2 seconds). When the second internal relay 62 is conducted, the coil 76 of the second external relay 75 is energized, whereby the switching contact 77 of the second external relay 75 which is normally biased to the 12V power source is switched to the terminal 82 side, which is connected to the ground. Then, the unlocking line 64 is connected to the ground via the terminal 80, the switching contact 77 and the terminal 82, so that one end of the DC motor as the door lock actuator 29 becomes into the ground potential and 12V is applied to the other end of the DC motor. Therefore, the DC motor as the door lock actuator 29 is rotated in the unlocking direction for a predetermined time (for example, about 0.1 to 0.2 seconds) during which the second internal relay 62, which is a normally open switch, is conducted, and then, the door lock is unlocked. Since the second internal relay 62, which is a normally open switch, is opened after a lapse of the predetermined time during which the second internal relay 62 is conducted, the switching contact 77 of the second external relay 75 is biased to a terminal 81, which is connected to the 12V power source, and the 12V power source is applied to both ends of the DC motor as the door lock actuator 29. Therefore, the DC motor stops its operating.

On the other hand, when a locking command is transmitted from the user terminal 37 to the user information management unit 38, the user information management unit 38 transmits a door lock locking command for transmitting a locking command to the specific vehicle 2 to the remote control instruction unit 31. Upon receiving the door lock locking command from the user information management unit 38, the remote control instruction unit 31 transmits the locking command to the specific vehicle 2. In the vehicle-mounted device 1, when the locking command is received from the remote control instruction unit 31, the first internal relay 61, which is a normally open switch, is conductively controlled for a predetermined time (for example, about 0.1 to 0.2 seconds). When the first internal relay 61 is conducted, the coil 66 of the first external relay 65 is energized, whereby the switching contact 67 of the first external relay 65, which is normally biased to the 12V power source, is switched to the terminal 72 side, which is connected to the ground. Then, the locking line 63 is connected to the ground via the terminal 70, the switching contact 67 and the terminal 72, so that the other end of the DC motor as the door lock actuator 29 becomes into the ground potential, and 12 V is applied to one end of the DC motor. Therefore, the DC motor as the door lock actuator 29 is rotated in the locking direction, which is opposite to the unlocking direction, for a predetermined time (for example, about 0.1 to 0.2 seconds) during which the first internal relay 61, which is a normally open switch, is conducted, and then, the door lock is locked. Since the first internal relay 61, which is a normally open switch, is opened after a lapse of the predetermined time during which the first internal relay 61 is conducted, the switching contact 67 of the first external relay 65 is biased to the terminal 71 connected to the 12V power source, and the 12V power source is applied to both ends of the DC motor as the door lock actuator 29. Therefore, the DC motor stops its operating.

<Acquisition of Vehicle Information>

The vehicle-mounted device 1 acquires vehicle information and transmits the vehicle information to the server 3 at predetermined intervals, for example, every 30 seconds, or at a time of occurrence of a certain event such as turning-on of the vehicle power, or both. The vehicle information here includes at least one of information on power supply input from the external battery 21 that is detected by the power supply input detecting unit 16, information on the running state identification line (ACC line, IGN line) detected by the IGN input detecting unit 17, for example, information indicating on/off of the engine, information on the engine starting external relay 20 that is detected by the engine starting relay input/output 18, the position information from the GPS that is detected by the GPS input/output unit 19, information on acceleration that is detected from a not-illustrated acceleration sensor, information on vehicle speed pulse, information on the fuel sensor, and information on the time when the vehicle information is acquired. The speed may be calculated from the GPS position information. The server 3 grasps a vehicle operation status based on such vehicle information.

<Control of Engine Starting External Relay>

When the vehicle-mounted device 1 receives an engine starting relay control command from the server 3, the control value thereof is stored into the memory 13, and the engine starting external relay 20 is controlled to attain a state corresponding to the value. A "vehicle information-associated control means" includes the CPU 11, the memory 13, the IGN input detecting unit 17, and the engine starting relay input/output unit 18 and, when the engine starting external relay 20 is switched, determines whether to employ an engine starting relay control command and not to employ (ignore an engine starting relay control command), considering the on/off switching timing of power of the vehicle, as will be described later. In the case of an internal combustion engine vehicle, the on/off of the power is detected from, for example, information on the running state identification line (ACC line, IGN line) that is detected by the IGN input detecting unit 17, for example, information indicating the on/off state of the engine.

A relay control value (the control value for the ST line relay) in a case where the engine starting control line (ST line) in an internal combustion engine vehicle is cut by the engine starting external relay 20 (the case in FIG. 3) is now described with reference to FIGS. 5A and 5B. FIG. 5A illustrates the case of a vehicle type having one engine starting control line, and FIG. 5B illustrates the case of a vehicle type having two engine starting control lines. First, the case of the vehicle type having one engine starting control line in FIG. 5A will be described. The relay value is "0" when the relay A is open, and it is "1" when closed. There are two external relay control values: "00" and "01". When the engine starting external relay control value is "00", the status is the starting-enabled state (normal) and the vehicle state is starting-enabled. On the other hand, when the engine starting external relay control value is "01", the status is the starting-disabled state and the vehicle state is starting-disabled.

The vehicle type having two engine starting control lines in FIG. 5B will now be described. When each of the relay A and the relay B is open, the relay value is "0", and when closed, the relay value is "1". There are four engine starting external relay control values: "00", "01", "10", and "11". When the engine starting external relay control value is "00", the status is the starting-enabled state (normal) and the vehicle state is starting-enabled. When the engine starting external relay control value is "01", the status is an unintended value and the vehicle state is starting-enabled. When the engine starting external relay control value is "10", the status is an unintended value and the vehicle state is starting-enabled. When the engine starting external relay control value is "11", the status is the starting-disabled state and the vehicle state is starting-disabled.

An "engine starting relay monitoring unit" includes the CPU 11, the memory 13, and the engine starting relay input/output 18 and monitors the relay state when the engine starting external relay control value is supposed to be the starting-enabled state due to a malfunction of firmware, as will be described later. As a result of the monitoring, when the relay state is a state other than the starting-enabled state, the relay state is set to the starting-enabled state, That is, the engine starting external relay control value is set to "00", and the engine starting external relay 20 is set to the starting-enabled state.

The wiring of the engine starting external relay 20 is now described with reference to FIG. 6. Normally open and normally closed can be selected by changing the connection state of the engine starting external relay 20. FIG. 6 illustrates an electromagnetic coil 41, a switch 42, terminals 43 and 44 on the engine starting relay input/output 18 side, one terminal 45 on the engine starting control line (ST line) side, a normally closed terminal 46, and a normally open terminal 47. Because the switch 42 is biased to the normally closed terminal 46 by a spring, the switch 42 is in contact with the normally closed terminal 46 side when the coil 41 is not energized. When the coil 41 is energized, the switch 42 is attracted to the electromagnet and comes into contact with the normally open terminal 47. Therefore, when the engine starting external relay 20 is intended to be used as the normally closed type, the other terminal of the ST line is connected to the normally closed terminal 46. Conversely, when the engine starting external relay 20 is intended to be used as the normally open type, the other terminal of the ST line is connected to the normally open terminal 47.

The difference between when the engine starting external relay 20 is used as the normally closed type and when the engine starting external relay 20 is used as the normally open type is now described with reference to FIG. 3. At least one of the power supply input detecting unit 16, the IGN input detecting unit 17, the engine starting relay input/output 18, and the GPS input/output unit 19 is provided with a means for detecting cutting-off or removal of wiring (not illustrated). As the means for detecting cutting-off or removal of the wiring, known methods such as using a wiring voltage change associated with cutting-off or removal of wiring, for example, as disclosed in Patent Literature 2 can be used. When the power supply input detecting unit 16 does not detect power supply input from the external battery 21, it can be determined that the wiring between the power supply input detecting unit 16 and the external battery 21 has been cut off or removed. The removal of the vehicle-mounted device can also be detected based on the cutting-off or removal of the wiring. It is determined in advance which control to perform, namely, to set the engine starting external relay 20 to the starting-disabled state (open) or to the starting-enabled state (closed) when cutting-off or removal of the wiring is detected, as will be described later.

When cutting-off or removal of the wiring is detected, the engine starting external relay 20 is controlled as previously mentioned and the server 3 is notified of the abnormality through the wireless communication module 12. When the server 3 receives the notification of the abnormality, the server 3 promptly notifies the manager. When receiving the notification of the abnormality from the server 3, the manager makes contact with the user to check on the occurrence of a theft and then reports theft of the vehicle to the police, if necessary. On the other hand, the vehicle-mounted device 1 gives a notification of the abnormality and also produces an alarm sound using an alarm (not illustrated) mounted on the vehicle-mounted device 1. Instead of an alarm mounted on the vehicle-mounted device 1, the horn, headlamp, blinker, hazard lamp, etc. of the vehicle may be used to produce an alarm. In order to do so, wiring may be connected such that an output signal for alarm output of the vehicle-mounted device 1 is input to the input terminals of the control circuits.

Here, detection of cutting-off or removal of the wiring has been described as an example of the notification of abnormality. Alternatively, the vehicle-mounted device 1 may further include a failure detecting means, so that when the failure detecting means detects a failure of the vehicle-mounted device 1, the server is notified of the failure of the vehicle-mounted device 1 through the wireless communication module 12. When the server 3 receives the notification of a failure of the vehicle-mounted device 1, the server reports the occurrence of a failure to the manager, and the manager receiving the report makes contact with the user of the corresponding vehicle and makes an arrangement to repair or exchange the vehicle-mounted device 1.

When cutting-off or removal of the wiring occurs between the engine starting relay input/output 18 and the engine starting external relay 20, current supply to the coil 41 of the engine starting external relay 20 is stopped, so that in the case of the normally closed type, the engine starting external relay 20 is closed and the ST line is connected, whereas in the case of the normally open type, the engine starting external relay 20 is open and the ST line is interrupted (cut).

As previously mentioned, the possible cases when the manager removes the vehicle-mounted device 1 from the vehicle 2 are (1) theft by a thief, (2) misuse of the vehicle by the user, and (3) use of the vehicle in an unavoidable and urgent case by the user who has not paid. When the vehicle-mounted device 1 has been removed from the vehicle 2, in cases where theft and misuse as in (1) and (2) are always assumed, it is desirable to set the vehicle to the starting-disabled state. Therefore, the normally open type is employed as the engine starting external relay 20, and it is determined in advance to control the engine starting external relay 20 to the starting-disabled state (open) also when cutting-off or removal of the wiring is detected. On the other hand, when the vehicle-mounted device 1 has been removed from the vehicle 2, in the urgent case as in (3), for example, when an emergency patient is to be transported, it is desirable to set the vehicle to the starting-enabled state so that the vehicle can be used in such a case. Therefore, the normally closed type is employed as the engine starting external relay 20, and it is determined in advance to control the engine starting external relay 20 to the starting-enabled state (closed) also when cutting-off or removal of the wiring is detected.

The vehicle-mounted device 1 can fail-safe independently, even in a poor radio wave condition and without an engine starting relay control command from the server 3. For example, this configuration avoids a situation in which the vehicle enters the starting-disabled state in a place with a poor radio wave condition and becomes unable to receive an engine starting relay control command corresponding to the starting-enable information. The vehicle-mounted device repeatedly retries communication to establish communication when the radio wave condition is poor. When communication fails to be established a predetermined number of times, for example, 20 or more retries in succession, it is determined that the communication has failed, and when the state of the engine starting external relay 20 is the starting-disabled state, switching to the starting-enabled state is performed. This configuration can avoid a situation in which the vehicle is left in the starting-disabled state because an engine starting relay control signal to change to the starting-enabled state is unable to be transmitted from the server 3 in a poor radio wave condition. Whether to employ the process of switching the vehicle to the starting-enabled state at the time of communication failure can be switched at the time of shipment of the vehicle.

<Power Saving Mode>

When the engine of an internal combustion engine vehicle is off, the vehicle-mounted device shifts to a power saving mode to stop the functions except the minimum required functions such as power supply management in order to prevent consumption of power of the external battery 21, after the elapse of a predetermined time, for example, 10 minutes since turning off of the engine. In the power saving mode, the power supply input detecting unit 16, the IGN input detecting unit 17, the engine starting relay input/output 18, and a timer circuit (not illustrated) are always active whereas the other circuits are stopped. During the power saving mode, the vehicle-mounted device 1 does not communicate with the server 3. During the power saving mode, if the power supply input detecting unit 16 detects loss of power supply input, if the IGN input detecting unit 17 detects the on state of the engine (ACC on or IGN on), or if the timer circuit counts a predetermined time (for example, every one hour), the corresponding circuit that is always active even in the power saving mode generates an interrupt to the CPU to switch the vehicle-mounted device 1 from the power saving mode to the normal mode. Because the engine starting relay input/output is always supplied with power even in the power saving mode, the state of the engine starting external relay 20 can be always kept.

<Wireless Communication Module>

As previously mentioned, in the normal mode, the vehicle-mounted device 1 acquires vehicle information and transmits the vehicle information to the server 3 at predetermined intervals, for example, every 30 seconds, or at the time of occurrence of a certain event such as when the vehicle power is turned on, or both. When the corresponding circuit that is always active generates an interrupt to the CPU to switch the vehicle-mounted device 1 from the power saving mode to the normal mode, the vehicle-mounted device 1 originates communication with the server 3 to receive an engine starting relay control command or transmit vehicle information. In the normal mode, in addition to communication originating from the vehicle-mounted device 1, the server 3 may originate communication, and the vehicle-mounted device 1 can receive information such as an engine starting relay control command. When a radio wave condition is poor, communication may be retried multiple times, for example, five times until communication is established. Even when the radio wave condition is poor and communication fails to be established, the vehicle-mounted device 1 can operate independently, because the vehicle-mounted device 1 stores an engine starting relay control command received from the server 3 in the latest communication in the memory. Furthermore, because the acquired vehicle information is stored in the memory, the vehicle-mounted device 1 can transmit the acquired information altogether to the server 3 when the communication line is recovered. It is also possible to prevent transmission or reception of the engine starting relay control command corresponding to the starting-disabled state when the radio wave condition is poor. This configuration can avoid the problem of being unable to change from the starting-disabled state to the starting-enabled state because of a poor radio wave condition.

A configuration in the memory 13 is now described with reference to FIG. 7. The memory 13 includes four process units: a communication unit 50, an engine starting relay control unit 51, an engine starting relay monitoring unit 55, and an engine-associated control unit 57. The engine starting relay control unit 51 includes an engine starting relay setting value 52, a vehicle type-basis starting-disable relay value 53, and a vehicle type-basis starting-enable relay value 54. The engine starting relay monitoring unit 55 includes an engine starting relay monitoring execution flag 56. The engine-associated control unit 57 includes a relay change-prohibited period 58, an engine stop time 59, and an engine state reevaluation period.

The communication unit 50 is a data region for communication with the server 3 and is used for transmission of vehicle information to the server 3 and reception of an engine starting relay control command from the server 3 through the wireless communication module 12. The engine starting relay control unit is a data region for changing the engine starting external relay 20 to a state corresponding to the relay value provided by the engine starting relay control command from the server 3. The engine starting relay monitoring unit 55 periodically monitors the state of the engine starting external relay 20, based on the relay state value of the starting-disabled state/starting-enabled state set as will be described later, in a situation in which the relay state should be the starting-enabled state, that is to say, the initial state, or when the last relay change request from the server 3 is to change to the starting-enabled state. As a result of the monitoring, if the engine starting external relay 20 is in a relay state other than the starting-enabled state, the state is changed to the starting-enabled state. The engine-associated control unit 57, receiving an engine starting relay control command from the server 3, ignores the engine starting relay control command if the engine is on for the past X minutes (for example, two minutes), and changes the relay to the starting-enabled state if the engine on is detected for Y seconds (for example, five seconds) after an engine starting relay control command for the starting-disabled state is executed.

Here, the ground for setting X minutes to, for example, two minutes will be described. The vehicle-mounted device 1 is switched to the power saving mode 10 minutes or so after the engine stops to suppress consumption of electric power. In the state of the power saving mode, when the user gets into the vehicle, inserts the key into the cylinder to start the engine, and turns the ignition into the on state, the IGN input detecting unit 17 detects that the engine is turned into the on state from the running state identification line (ACC line, IGN line) 22 and generates an interrupt to the CPU 11 to switch the vehicle-mounted device 1 to the normal mode. It takes about one minute when the radio wave condition is good, and takes about one minute and thirty seconds when the communication has to be retried five times or so because of a poor radio wave condition, until the server 3 recognizes that the vehicle-mounted device 1 has been switched to the normal mode. An engine starting relay control command to give an instruction to switch to the starting-disabled state is not employed (ignored) for a predetermined period after the power of the vehicle is turned off, thereby preventing the vehicle from improperly switching to the starting-disabled state when the power of the vehicle is turned on again immediately after the power of the vehicle is turned off. For example, it is possible to prevent the vehicle from improperly switching to the starting-disabled state in a case where while baggage is unloaded from the trunk or seat in a parking area, the vehicle is temporarily stopped at a position slightly displaced from the parking space, with the power of the vehicle turned off, and after unloading of baggage, the vehicle is pulled into the parking space by turning on the power of the vehicle again. Conversely, when X minutes are too long, the vehicle may be unable to be switched to the starting-disabled state in some cases. Given this, it is determined that the engine starting relay control command is ignored when the engine is on for the past two minutes. Therefore, X minutes are appropriately determined according to the specific performance of the server 3 and the like.

The ground for setting Y seconds to, for example, five seconds will now be described. When an engine starting relay control command is received while the power of the vehicle is on, the vehicle-mounted device 1 does not accept an engine starting relay control command (ignores an engine starting relay control command), considering the safety. While the power of the vehicle is on, the user is moving on the vehicle. Thus, improper switching of the vehicle to the starting-disabled state is prevented, for example, when reception of an engine starting relay control command to change the vehicle to the starting-disabled state is delayed due to a poor radio wave condition. On the other hand, it takes about three seconds until the vehicle-mounted device 1 recognizes the starting of the vehicle after the vehicle is actually started. If the vehicle-mounted device 1 receives an engine starting relay control command immediately after the vehicle is started, the vehicle-mounted device 1 determines that the vehicle is not started and then employs the engine starting relay control command, so that the vehicle is switched to the starting-disabled state although the vehicle is started. As will be described later, when the ignition switch is a push button switch, the starting-disabled state is set by invalidating the push button or by activating the immobilizer (cutting the line for authentication). Of these methods, in the case of invalidating the push button, if switching to the starting-disabled state occurs in the three seconds, the engine is unable to be turned off. On the other hand, in the case of activating the immobilizer, if switching to the starting-disabled state occurs in the three seconds, the push button works to allow the engine to be turned off but the gear lever will not move into Drive. Based on the foregoing, three seconds plus a margin, that is, five seconds are employed as Y seconds. Therefore, Y seconds are appropriately determined according to the specific performance and the like of the vehicle-mounted device 1.

The variables of the memory 13 illustrated in FIG. 7 will now be described. The engine starting relay setting value 52 is a relay value corresponding to the present state of the engine starting external relay 20. The vehicle type-basis starting-disable relay value 53 is a setting value for each vehicle type corresponding to the state of the engine starting external relay 20 for setting the vehicle to the starting-disabled state. The vehicle type-basis starting-enable relay value 54 is a setting value for each vehicle type corresponding to the state of the engine starting external relay 20 for setting the vehicle to the starting-enabled state. The engine starting relay monitoring execution flag 56 is a flag for determining whether to execute monitoring of the engine starting external relay 20 and is turned on in the initial state (at the time of shipment of the vehicle) or when the last relay control command from the server 3 is to change to the starting-enabled state. The relay change-prohibited period is a period (X minutes, for example, two minutes) during which change of the engine starting external relay 20 is prohibited after the engine is stopped. The engine stop time is the time when the previous engine stop is detected. The engine state reevaluation period is a period (Y seconds, for example, five seconds) during which the engine on is reevaluated after the control to set the starting-disabled state is performed.

One of the vehicle type-basis starting-disable relay value 53 and the vehicle type-basis starting-enable relay value 54 may be stored according to the type of the vehicle, or values of different vehicle types may be stored in advance and one of them may be selected according to the type of the vehicle. The vehicle type-basis starting-disable relay value 53 and the vehicle type-basis starting-enable relay value 54 may be set from the console input/output 14 or may be set from the server 3. In terms of fail-safe for noise, it is preferable that the relay values are set from the server 3.

The operation of each process units of the memory 13 will now be described with reference to the flowcharts in FIG. 8 to FIG. 10. First, the operation of the engine starting relay control unit 51 is described with reference to FIG. 8. When the engine starting relay control unit process is started in S11, first, in S12, the engine starting relay setting value 52 is overwritten with the given relay value. Next, in S13, the relay state of the engine starting external relay 20 is changed to the state of the engine starting relay setting value 52. Then, in S14, it is determined whether the relay value of the engine starting relay control command is identical with the vehicle type-basis starting-enable relay value 54. If Yes, the process proceeds to S15 to turn on the engine starting relay monitoring execution flag 56, and then proceeds to S16. If No in the determination in S14, the process proceeds to S16 to invoke the communication unit and notify the server 3 that the engine starting relay state change is completed. Subsequently, in S17, the engine starting relay control unit process ends. The engine starting relay control unit 51 is invoked in S25 of the engine starting relay monitoring unit 55 in FIG. 9 described later and in S36 of the engine-associated control unit 57 in FIG. 10 described later to start processing.

The operation of the engine starting relay monitoring unit is now described with reference to FIG. 9. When the engine starting relay monitoring unit process is started in S21, first, in S22, it is determined whether the engine starting relay monitoring execution flag 56 is on. As described above, the engine starting relay monitoring execution flag 56 is a flag for determining whether to execute monitoring of the engine starting external relay 20 and is set on in the initial state (at the time of shipment of the vehicle) or when the last relay control command from the server 3 is to change to the starting-enabled state. If the determination in S22 is Yes, the process proceeds to S23 and, after the relay state of the engine starting external relay 20 is acquired, proceeds to S24. On the other hand, if the determination in S22 is No, the process proceeds to S26 to terminate the engine starting relay monitoring unit process. In S24, it is determined whether the relay value acquired in S23 is a value other than the vehicle type-basis starting-enable relay value 54. If Yes, the process proceeds to S25 to invoke the engine starting relay control unit 51. After the engine starting relay setting value 52 is overwritten with the vehicle type-basis starting-enable relay value 54 corresponding to the starting-enabled state, the state of the engine starting external relay 20 is changed to the state corresponding to the vehicle type-basis starting-enable relay value 54. After that, the process proceeds to S26 to terminate the engine starting relay monitoring unit process. On the other hand, if No in the determination in S24, the process proceeds to S26 to terminate the engine starting relay monitoring process.

The operation of the engine starting relay monitoring unit is periodically performed, for example, every 30 seconds in the normal mode, every hour in the power saving mode. With this operation of the engine starting relay monitoring unit, in the supposed-to-be starting-enabled state (when the engine starting relay monitoring flag is on), the engine starting external relay 20 can be controlled such that the vehicle always enters the starting-enabled state, even when the memory 13 is rewritten with a numerical value different from the original numerical value due to a malfunction of firmware of the vehicle-mounted device. This control can prevent the vehicle from unintentionally entering the starting-disabled state and disturbing legitimate use of the vehicle. For example, even when the value of the engine starting relay setting value 52 in the memory 13 is rewritten with an unintended value due to a malfunction of firmware of the vehicle-mounted device, the engine starting external relay 20 is controlled such that the vehicle always enters the starting-enabled state when the relay monitoring execution flag is on, thereby keeping the vehicle in the starting-enabled state.

The operation of the engine-associated control unit 57 is now described with reference to FIG. 10. When the engine-associated control unit process is started in S31, the process proceeds to S32 to receive an engine starting relay control command through the communication unit 50. The process then proceeds to S33 to determine whether the present engine state is off. If the determination in S33 is Yes, the process proceeds to S34. In S34, it is determined whether the difference between the present time and the engine stop time is equal to or longer than the relay change-prohibited period 58 (X minutes). If the determination in S33 is No and the determination in S34 is No, the process proceeds to S35 to invoke the communication unit 50 and notify the server 3 that the engine starting relay control command is ignored. Subsequently, the process proceeds to S41 and the process of the engine-associated control unit ends. If the determination in S34 is Yes, the process proceeds to S36 to invoke the engine starting relay control unit 51 and change the state of the engine starting external relay 20 to the state corresponding to the engine starting relay control command. The process then proceeds to S37. In S37, the process waits for an engine state reevaluation period 60 (Y seconds) and then proceeds to S38. In S38, it is determined whether the executed relay control command is to change to the starting-disabled state and the present engine state is on. If the determination in S38 is Yes, the process proceeds to S39. In S39, the engine starting relay control unit 51 is invoked, and the state of the engine starting external relay 20 is changed to the state corresponding to the vehicle type-basis starting-enable relay value 54. Subsequently, the process proceeds to S40. In S40, the communication unit 50 is invoked, and the server 3 is notified that the engine starting relay control command is ignored. The process then proceeds to S41 and the process of the engine-associated control unit ends. On the other hand, If the determination in S38 is No, the process goes on to S41 and the process of the engine-associated control unit ends.

The operation of the engine-associated control unit 57 is performed periodically, for example, every 30 seconds in the normal mode and every hour in the power saving mode. In S35 and S40, the communication unit 50 is invoked and the server 3 is notified that the engine starting relay control command is ignored. The server 3, which receives the notification that the engine starting relay control command has been ignored, repeatedly transmits an engine starting relay control command until a notification in which the state of the engine starting external relay 20 is changed is given in S16 in FIG. 8. This operation of the engine-associated control unit 57 can prevent the vehicle from entering the starting-disabled state in a dangerous place or in a place where the vehicle obstructs people, considering safety of the vehicle, when the vehicle is to be changed to the starting-disabled state under an instruction from the server. With the relay change-prohibited period 58 (X minutes, for example, two minutes) taken into consideration, it is possible to prevent the vehicle from improperly switching to the starting-disabled state even when the power of the vehicle is turned on again immediately after the power of the vehicle is turned off. In addition, with the engine state reevaluation period 60 (Y seconds, for example, five seconds) taken into consideration, the engine starting relay control command is not employed (the engine starting relay control command is ignored) when the vehicle-mounted device 1 receives an engine starting relay control command corresponding to the starting-disabled state immediately after the power of the vehicle is turned on (within Y seconds), thereby preventing the problem of switching to the starting-disabled state when the power of the vehicle is on.

Second Embodiment

A vehicle starting control system, a vehicle-mounted device, a vehicle, a server, a vehicle starting method, a vehicle starting program, and a storage medium according to the second embodiment of the present invention will be described with reference to FIG. 11. FIG. 11 is an overall diagram of the vehicle starting control system according to the second embodiment. The same configuration as in FIGS. 1 to 10 are denoted with the same reference signs and will not be further described. In the first embodiment, the vehicle starting command (for example, the engine starting relay control command to set the engine to a starting-enabled state or the door lock key information) is transmitted from the server 3 to the vehicle-mounted device 1 by communication from the server 3 to the vehicle-mounted device 1. On the other hand, the second embodiment differs from the first embodiment in that the vehicle starting command is provided from the server 3 to the vehicle-mounted device 1 via the user terminal 37.

The control in A12 of the flowchart of FIG. 2, that is, the control when switching again to the starting-enabled state after once being switched to the starting-disabled state, will be described. In A9, the user is informed that the vehicle is in the starting-disabled state because the charge has not been paid, and the user is designated for a predetermined period of time and is prompted to pay the predetermined charge. Then, the process proceeds to A10. In A10, the payment status monitoring unit 30 monitors the payment status of the user in real time by using the API 39 of the financial system 36, and in A11, whether or not the charge has been paid by the user of the vehicle within the predetermined period is determined.

In the case of Yes in the determination of A11 (when payment has been made), the process proceeds to A12, and the server 3 provides the vehicle-mounted device 1 with the engine starting relay control instruction in order to set the vehicle to the starting-enabled state again. At this time, in this embodiment, the server 3 provides the vehicle-mounted device 1 with an engine starting relay control command for setting the vehicle to the starting-enabled state again via the user terminal 37. That is to say, the payment status monitoring unit 30 monitors the payment status of the user in real time by using the API 39 of the financial system 36, and when it is detected that the user has paid the charge within a predetermined period, the engine starting relay control command information for switching the vehicle to the starting state is transmitted from the user information management unit 38 of the server 3 to the user terminal 37 of the user.

The user terminal 37 and the vehicle-mounted device 1 each have a built-in transmission/reception device for specific short-range wireless communication. Examples of this short-range wireless communication include Bluetooth (registered trademark), ZigBee (registered trademark), infrared communication, RFID (Radio Frequency Identifier), NFC (Near Field Communication), and the like. However, the present invention is not limited thereto and any type of short-range wireless communication is included. For example, when NFC is used, formats such as a type (inexpensive type), b type (type adopted in ETC in Europe), f type (FeliCa (registered trademark)) and the like can be adopted. When the user holds the user terminal 37 over the NFC terminal on the vehicle-mounted device 1 side, the engine starting relay control command information that the user terminal 37 receives from the server 3 for setting the vehicle 2 to the starting-enabled state can be transmitted from the user terminal 37 to the vehicle-mounted device 1. As a result, the vehicle 2 is switched to the starting-enabled state again. The door lock of the vehicle 2 can be locked and unlocked in the same manner via the user terminal 37. In this case, the door lock key information is transmitted from the server 3 to the user terminal 37, and by holding the user terminal 37 over the NFC terminal on the vehicle-mounted device 1 side, the user terminal 37 transmits the door lock key information of the vehicle 2 received from the server 3 to the vehicle-mounted device 1. This allows the user terminal 37 to control locking and unlocking of the door lock of the vehicle 2.

Compared with the case where the remote control command unit 31 transmits the door lock key information and the engine starting relay control command information to the vehicle-mounted device 1 through the wireless communication network 34, in the case where the door lock key information and the engine starting relay control command information received from the server 3 are stored in the user terminal 37, if the communication between the server 3 and the user terminal 37 is secured, the door lock can be locked and unlocked promptly and the vehicle 2 can be set to a starting-enabled state quickly without depending on the communication status of the wireless communication network 34. Therefore, the vehicle 2 can be quickly and reliably switched to the starting-enabled state without depending on the parking position of the vehicle. Further, when the vehicle-mounted device 1 is in the sleep mode, it may take about one hour in a bad case to switch the vehicle 2 to the starting-enabled state. However, for example, by holding the user terminal 37 over the NFC terminal of the vehicle-mounted device 1, the vehicle starting command can be transmitted directly to the vehicle-mounted device 1. Therefore, it is possible to quickly control the starting state of the vehicle 2 (for example, switching the vehicle 2 to the starting-enabled state and unlocking the door lock key of the vehicle 2) even when the vehicle-mounted device 1 is in the sleep mode.

Also in a system in which the vehicle-mounted device 1 can receive the door lock key information and the engine starting relay control command from the user terminal 37, the vehicle-mounted device 1 may receive the door lock key information and the engine starting relay control command from the server 3. In this case, even in a case where the user loses the user terminal 37 or leaves it at home or the like, if the user is authenticated and the reservation content is confirmed using another communication means to the server 3, the door lock can be locked and unlocked by transmitting a locking command and an unlocking command to the vehicle-mounted device 1 via the server 3.

Third Embodiment

A vehicle starting control system, a vehicle-mounted device, a vehicle, a server, a vehicle starting method, a vehicle starting program, and a storage medium according to the third embodiment of the present invention will be described with reference to FIG. 12. FIG. 12 is an overall diagram of the vehicle starting control system according to the third embodiment. The same configuration as in FIGS. 1 to 11 are denoted with the same reference signs and will not be further described. In the second embodiment, the vehicle starting command is transmitted to the vehicle-mounted device 1 via the user terminal 37, but in the third embodiment, an IC card 90 in which the vehicle starting command has been written by a card writer 91 is used and the vehicle starting command is read using a card reader 92 of the vehicle-mounted device 1. These points are different from the second embodiment. It should be noted that the user terminal 37 is not an essential component in FIG. 12.

The control in A12 of the flowchart of FIG. 2, that is, the control when switching again to the starting-enabled state after once being switched to the starting-disabled state, will be described. In A9, the user is informed that the vehicle is in the starting-disabled state because the charge has not been paid, and the user is designated for a predetermined period of time and is prompted to pay the predetermined charge. Then, the process proceeds to A10. In A10, the payment status monitoring unit 30 monitors the payment status of the user in real time by using the API 39 of the financial system 36, and in A11, whether or not the charge has been paid by the user of the vehicle within the predetermined period is determined.

In the case of Yes in the determination of A11 (when payment has been made), the process proceeds to A12, and the server 3 provides the vehicle-mounted device 1 with the engine starting relay control instruction in order to set the vehicle into the starting-enabled state again. At this time, in this embodiment, the server 3 provides the vehicle-mounted device 1 with an engine starting relay control command for setting the vehicle into the starting-enabled state again via the IC card 90.

The payment status monitoring unit 30 monitors the payment status of the user 5 in real time by using the API 39 of the financial system 36. Therefore, it is possible to recognize in real time that the user 5 has made a predetermined payment, and immediately after the predetermined payment is made, the user information management unit 38 can allow the card writer 91 to write the engine starting relay control command information for setting the vehicle to the starting-enabled state in the IC card 90. The vehicle-mounted device 1 is provided with the card reader 92, and when the user holds the IC card 90 over the card reader 92, the engine starting relay control command information for setting the vehicle to the starting-enabled state is transmitted from the IC card 90 to the vehicle-mounted device 1 side. As a result, the vehicle-mounted device 1 switches the vehicle 2 to the starting-enabled state again.

Examples of the IC card format include, for example, RFID, NFC and the like. However, the present invention is not limited thereto and any format of IC card can be used. As the card writer 91 and the card reader 92, those corresponding to the format of the IC card 90 are used. When NFC is used, for example, each type described above (a type, b type, f type, etc.) can be adopted.

Compared with the case where the remote control command unit 31 transmits the door lock key information and the engine starting relay control command information to the vehicle-mounted device 1 through the wireless communication network 34, in the case where the door lock key information and the engine starting relay control command information are written in the IC card 90, the door lock can be locked and unlocked promptly and the vehicle 2 can be set to a starting-enabled state quickly without depending on the communication status of the wireless communication network 34. Further, when the vehicle-mounted device 1 is in the sleep mode, it may take about one hour in a bad case to switch the vehicle 2 to the starting-enabled state. However, by holding the IC card 90 over the card reader 92, the vehicle starting command can be transmitted directly to the vehicle-mounted device 1. Therefore, it is possible to quickly control the starting state of the vehicle 2 (for example, switching the vehicle 2 to the starting-enabled state and unlocking the door lock key of the vehicle 2) even when the vehicle-mounted device 1 is in the sleep mode.

Further, even in the system in which the vehicle-mounted device 1 includes the IC card reader 92 and the door lock key information and the engine starting relay control command can be input using the IC card 90, a means for communicating the door lock key information and the engine starting relay control command from the user terminal 37 to the vehicle-mounted device 1 by the short-range wireless means and a means for communicating the door lock key information and the engine starting relay control command to the vehicle-mounted device 1 via the remote control command unit 31 of the server 3 may be included. In this case, even in a case where the user loses the IC card 90 or leaves it at home or the like, the vehicle starting operation can be controlled by communicating with the vehicle-mounted device 1 using the user terminal 37. Furthermore, if the user is authenticated and the reservation content is confirmed using another communication means to the server 3, by transmitting a locking command and an unlocking command to the vehicle-mounted device 1 via the server 3, the door lock can be locked and unlocked and the vehicle starting operation can be controlled. In this way, by being provided with a plurality of communication means, the locking and unlocking operation of the door lock and the vehicle starting operation can be controlled by the convenient means for users. Therefore, it is possible to provide a highly convenient system for users.

Fourth Embodiment

Operations of the internal relay and the external relay according to the fourth embodiment of the present invention will be described with reference to FIG. 13. FIG. 13 is a wiring diagram of a door lock actuator control circuit 26A according to the fourth embodiment. As types of the door lock actuator control circuit 26, there are following five types depending on the wiring of the 12V power source and the ground.
(1) minus control (normally, the locking and unlocking lines are 12V power supply)
(2) plus control 1 (normally, the locking and unlocking lines are grounded.)
(3) plus control 2 (normally, the locking and unlocking lines are normally open.)
(4) minus plus control (ground when locked, 12V power supply when unlocked)
(5) plus minus control (12V power supply when locked, ground when unlocked)

The first embodiment corresponds to (1) minus control, and the fourth embodiment corresponds to (2) plus control 1. Regarding the fifth to eighth embodiments described later, the fifth embodiment corresponds to (3) plus control 2, the sixth embodiment is a modification of (3) plus control 2, and the seventh embodiment corresponds to (4) minus plus control. The eighth embodiment corresponds to (5) plus minus control.

In a circuit of the fourth embodiment, the door lock is locked or unlocked by connecting the locking line 63 to the 12V power source. The vehicle-mounted device 1 including the first internal relay 61, which is connected is connected between a door key lock switch 85 and the door lock actuator 29, and the second internal relay 62, which is connected between a door key unlock switch 86 and the door lock actuator 29. By operating the first internal relay 61 and the second internal relay 62 of the vehicle-mounted device 1, the door lock actuator 29 can be controlled via the first external relay 65 and the second external relay 75.

The door lock actuator 29 is, for example, a DC motor capable of forward and reverse rotation, and both ends of the DC motor are connected to the locking line 63 and the unlocking line 64 that are normally connected to the ground. The locking line 63 is connected to the terminal 70 of the first external relay. The unlocking line 64 is connected to the terminal 80 of the second external relay 75. The switching contact 67 connected to the terminal 70 of the first external relay is mechanically biased to the terminal 71 side which is normally connected to the ground. When the coil 66 is energized, the contact 67 is switched to the terminal 72 which is connected to the 12V power source. The terminal 68 at one end of the coil 66 is connected to the ground similarly to the terminal 71. The terminal 69 at the other end of the coil 66 is connected to one end of the door key lock switch 85 which is a normally open switch, and the other end of the door key lock switch 85 is connected to the 12V power source. One end of the door key lock switch 85 is connected to one end of the first internal relay 61 which is a normally open switch, and the other end of the first internal relay 61 is connected to the 12V power source.

The switching contact 77 connected to the terminal 80 of the second external relay is mechanically biased to the terminal 81 side which is normally connected to the ground. When the coil 76 is energized, the switching contact 77 is switched to the terminal 82 which is connected to the 12V power source. A terminal 78 at one end of the coil 76 is connected to the ground similarly to the terminal 81. A terminal 79 at the other end of the coil 76 is connected to one end of the door key unlock switch 86 which is a normally open switch, and the other end of the door key unlock switch 86 is connected to the 12V power source. One end of the door key unlock switch 86 is connected to one end of the second internal relay which is a normally open switch, and the other end of the second internal relay 62 is connected to the 12V power source.

When an unlocking command is transmitted from the user terminal 37 to the user information management unit 38 and the user information management unit 38 determines that the unlocking command from the user terminal 37 is valid, a door lock unlocking command for transmitting an unlocking command to the specific vehicle 2 is transmitted to the remote control instruction unit 31. Upon receiving the door lock unlocking command from the user information management unit 38, the remote control instruction unit 31 transmits the unlocking command to the specific reserved vehicle 2. In the vehicle-mounted device 1, when the unlocking command is received from the remote control instruction unit 31, the second internal relay 62, which is a normally open switch, is conductively controlled for a predetermined time (for example, about 0.1 to 0.2 seconds). When the second internal relay 62 is conducted, the coil 76 of the second external relay 75 is energized, whereby the switching contact 77 of the second external relay 75, which is biased to the terminal 81 that is normally connected to the ground, is switched to the terminal 82 side, which is connected to the 12V power source. Then, the unlocking line 64 is connected to the 12V power source via the terminal 80, the switching contact 77, and the terminal 82, so that 12V is applied to one end of the DC motor as the door lock actuator 29 and the other end of the DC motor is at the ground potential. Therefore, the DC motor as the door lock actuator 29 is rotated in the unlocking direction for a predetermined time (for example, about 0.1 to 0.2 seconds) during which the second internal relay 62, which is a normally open switch, is conducted, and then, the door lock is unlocked. Since the second internal relay 62, which is a normally open switch, is opened after a lapse of the predetermined time during which the second internal relay 62 is conducted, the switching contact 77 of the second external relay 75 is biased to the terminal 81, which is connected to the ground, and the both ends of the DC motor as the door lock actuator 29 becomes into the ground potential. Therefore, the DC motor stops its operating.

On the other hand, when a locking command is transmitted from the user terminal 37 to the user information management unit 38, the user information management unit 38 transmits a door lock locking command for transmitting a locking command to the specific vehicle 2 to the remote control instruction unit 31. Upon receiving the door lock locking command from the user information management unit 38, the remote control instruction unit 31 transmits the locking command to the specific vehicle 2. In the vehicle-mounted device 1, when the locking command is received from the remote control instruction unit 31, the first internal relay 61, which is a normally open switch, is conductively controlled for a predetermined time (for example, about 0.1 to 0.2 seconds). When the first internal relay 61 is conducted, the coil 66 of the first external relay 65 is energized, whereby the switching contact 67 of the first external relay 65, which is normally biased to the ground, is switched to the terminal 72 side, which is connected to the 12V power source. Then, the locking line 63 is connected to the 12V power source via the terminal 70, the switching contact 67, and the terminal 72, so that 12V is applied to the other end of the DC motor as the door lock actuator 29, and one end of the DC motor is at the ground potential. Therefore, the DC motor as the door lock actuator 29 is rotated in the locking direction, which is opposite to the unlocking direction, for a predetermined time (for example, about 0.1 to 0.2 seconds) during which the first internal relay 61, which is a normally open switch, is conducted, and then, the door lock is locked. Since the first internal relay 61, which is a normally open switch, is opened after a lapse of the predetermined time during which the first internal relay 61 is conducted, the switching contact 67 of the first external relay 65 is biased to the terminal 71 connected to the ground, and both ends of the DC motor as the door lock actuator 29 are connected to the ground. Therefore, the DC motor stops its operating.

Fifth Embodiment

Operations of the internal relay and the external relay according to the fifth embodiment of the present invention will be described with reference to FIG. 14. FIG. 14 is a wiring diagram of a door lock actuator control circuit 26B according to the fifth embodiment. The type of the door lock actuator control circuit 26 corresponds to the above-mentioned (3) plus control 2. By connecting a 12V power source to a locking line 63B and an unlocking line 64B connected to a door lock relay unit 73B, the DC motor as a door lock actuator 29B is driven to lock and unlock the door lock. The vehicle-mounted device 1 including the first internal relay 61 and the second internal relay 62 is connected between the door key switch and the door lock actuator 29 via the first external relay 65B and the second external relay 75B, and by the control of the first internal relay 61B and the second internal relay 62B, the DC motor as the door lock actuator 29B is driven to lock and unlock the door lock.

When an unlocking command is transmitted from the user terminal 37 to the user information management unit 38 and the user information management unit 38 determines that the unlocking command from the user terminal 37 is valid, a door lock unlocking command for transmitting an unlocking command to the specific vehicle 2 is transmitted to the remote control instruction unit 31. Upon receiving the door lock unlocking command from the user information management unit 38, the remote control instruction unit 31 transmits the unlocking command to the specific reserved vehicle 2. In the vehicle-mounted device 1, when the unlocking command is received from the remote control instruction unit 31, the second internal relay 62B, which is a normally open switch, is conductively controlled for a predetermined time (for example, about 0.1 to 0.2 seconds). A switching contact 77B of the second external relay 75B is connected to the 12V power source. When the second internal relay 62B is conducted, a coil 76B of the second external relay 75B is energized, whereby the switching contact 77B of the second external relay 75B which is normally biased to an open terminal 82B, is switched to a terminal 81B, which is connected to the unlocking line 64B. Then, 12V is applied to the unlocking line 64B from the 12V power source via the terminal 81B and the switching contact 77B. Therefore, the DC motor as the door lock actuator 29 is rotated in the unlocking direction for a predetermined time (for example, about 0.1 to 0.2 seconds) during which the second internal relay 62B, which is a normally open switch, is conducted, and then, the door lock is unlocked. Since the second internal relay 62B, which is a normally open switch, is opened after a lapse of the predetermined time during which the second internal relay 62B is conducted, the switching contact 77B of the second external relay 75B is biased to the open terminal 82B. Then, the DC motor stops its operating.

When a locking command is transmitted from the user terminal 37 to the user information management unit 38, the user information management unit 38 transmits a door lock locking command for transmitting a locking command to the specific vehicle 2 to the remote control instruction unit 31. Upon receiving the door lock locking command from the user information management unit 38, the remote control instruction unit 31 transmits the locking command to the specific reserved vehicle 2. In the vehicle-mounted device 1, when the locking command is received from the remote control instruction unit 31, the first internal relay 61B, which is a normally open switch, is conductively controlled for a predetermined time (for example, about 0.1 to 0.2 seconds). A switching contact 67B of the first external relay 65B is connected to the 12V power source. When the first internal relay 61B is conducted, a coil 66B of the first external relay 65B is energized, whereby the switching contact 67B of the first external relay 65B, which is normally biased to an open terminal 72B, is switched to a terminal 71B, which is connected to the locking line 63B. Then, 12V is applied to the locking line 63B from the 12V power source via the terminal 71B and the switching contact 67B. Therefore, the DC motor as the door lock actuator 29 is rotated in the locking direction, which is opposite to the unlocking direction, for a predetermined time (for example, about 0.1 to 0.2 seconds) during which the first internal relay 61B, which is a normally open switch, is conducted, and then, the door lock is locked. Since the first internal relay 61B, which is a normally open switch, is opened after a lapse of the predetermined time during which the first internal relay 61B is conducted, the switching contact 67B of the first external relay 65B is biased to the open terminal 72B. Then, the DC motor as the door lock actuator 29 stops its operating.

Sixth Embodiment

Operations of the internal relay and the external relay according to the sixth embodiment of the present invention will be described with reference to FIG. 15. FIG. 15 is a wiring diagram of a door lock actuator control circuit 26C according to the sixth embodiment. The type of the door lock actuator control circuit 26 is a modification of the above-mentioned (3) plus control 2. By connecting the 12V power source to a locking line 63C and an unlocking line 64C connected to a door lock relay unit 73C, the DC motor as a door lock actuator 29C is driven to lock and unlock the door lock. After connecting the first external relay 65C so that the first external relay 65C bypasses the locking line 63C, the original wiring of the bypassed portion of the locking line 63C is cut. Similarly, after connecting the second external relay 75C so that the second external relay 75C bypasses the unlocking line 64C, the original wiring of the bypassed portion of the unlocking line 64C is cut. The vehicle-mounted device 1 including the first internal relay 61C and the second internal relay 62C is connected between the door key switch and the door lock actuator 29 via the first external relay 65C and the second external relay 75C, and by the control of the first internal relay 61C and the second internal relay 62C, the DC motor as the door lock actuator 29C is driven to lock and unlock the door lock.

When an unlocking command is transmitted from the user terminal 37 to the user information management unit 38 and the user information management unit 38 determines that the unlocking command from the user terminal 37 is valid, a door lock unlocking command for transmitting an unlocking command to the specific vehicle 2 is transmitted to the remote control instruction unit 31. Upon receiving the door lock unlocking command from the user information management unit 38, the remote control instruction unit 31 transmits the unlocking command to the specific reserved vehicle 2. In the vehicle-mounted device 1, when the unlocking command is received from the remote control instruction unit 31, the second internal relay 62C, which is a normally open switch, is conductively controlled for a predetermined time (for example, about 0.1 to 0.2 seconds). A terminal 80C, a switching contact 77C and a terminal 82C of the second external relay 75C normally bypass the cut portion of the unlocking line 64C. When the second internal relay 62C, which is a normally open switch, is conductively controlled for a predetermined time (for example, about 0.1 to 0.2 seconds), a coil 76C of the second external relay 75C is energized, whereby the switching contact 77C is switched to a terminal 81C, which is connected to the 12V power source. Then, 12V is applied to the unlocking line 64C from the 12V power source via the terminal 80C, the switching contact 77C and the terminal 81C. Therefore, the DC motor as the door lock actuator 29C is rotated in the unlocking direction for a predetermined time (for example, about 0.1 to 0.2 seconds) during which the second internal relay 62C, which is a normally open switch, is conducted, and then, the door lock is unlocked. Since the second internal relay 62C, which is a normally open switch, is opened after a lapse of the predetermined time during which the second internal relay 62C is conducted, the switching contact 77C of the second external relay 75C is biased to the terminal 82C to bypass the cut portion of the unlocking line 64C. Therefore, the DC motor as the door lock actuator 29 stops its operating.

When a locking command is transmitted from the user terminal 37 to the user information management unit 38, the user information management unit 38 transmits a door lock locking command for transmitting a locking command to the specific vehicle 2 to the remote control instruction unit 31. Upon receiving the door lock locking command from the user information management unit 38, the remote control instruction unit 31 transmits the locking command to the specific reserved vehicle 2. In the vehicle-mounted device 1, when the locking command is received from the remote control instruction unit 31, the first internal relay 61C, which is a normally open switch, is conductively controlled for a predetermined time (for example, about 0.1 to 0.2 seconds). A terminal 70C, a switching contact 67C and a terminal 72C of the first external relay 65C normally bypass the cut portion of the locking line 63C. When the first internal relay 61C, which is a normally open switch, is conductively controlled for a predetermined time (for example, about 0.1 to 0.2 seconds), a coil 66C of the first external relay 65C is energized, whereby the switching contact 67C is switched to a terminal 71C, which is connected to the 12V power source. Then, 12V is applied to the locking line 63C from the 12V power source via the terminal 70C and the switching contact 67C and the terminal 71C. Therefore, the DC motor as the door lock actuator 29C is rotated in the locking direction, which is opposite to the unlocking direction, for a predetermined time (for example, about 0.1 to 0.2 seconds) during which the first internal relay 61C, which is a normally open switch, is conducted, and then, the door lock is locked. Since the first internal relay 61C, which is a normally open switch, is opened after a lapse of the predetermined time during which the first internal relay 61C is conducted, the switching contact 67C of the first external relay 65C is biased to the terminal 72C to bypass the cut portion of the locking line 63C. Therefore, the DC motor as the door lock actuator 29 stops its operating.

Seventh Embodiment

Operations of the internal relay and the external relay according to the seventh embodiment of the present invention will be described with reference to FIG. 16. FIG. 16 is a wiring diagram of a door lock actuator control circuit 26D according to the seventh embodiment. The type of the door lock actuator control circuit 26 corresponds to the above-mentioned (4) minus plus control. A locking/unlocking line 74D connected to a door lock relay unit 73D is connected to the vacuum pump unit which is a door lock actuator 29D, and the locking/unlocking line 74D becomes into the ground potential when locked and becomes 12V power source when unlocked. After connecting the series circuit of the first external relay 65D and the second external relay 75D so that the series circuit bypasses the locking/unlocking line 74D, the original wiring is cut at the bypassed portion of the locking/unlocking line 74D. The vehicle-mounted device 1 including the first internal relay 61D and the second internal relay 62D is connected between the door key switch and the door lock actuator 29D via the first external relay 65D and the second external relay 75D. By the control of the first internal relay 61D and the second internal relay 62D, the vacuum pump unit as the door lock actuator 29D is driven to lock and unlock the door lock.

When an unlocking command is transmitted from the user terminal 37 to the user information management unit 38 and the user information management unit 38 determines that the unlocking command from the user terminal 37 is valid, a door lock unlocking command for transmitting an unlocking command to the specific vehicle 2 is transmitted to the remote control instruction unit 31. Upon receiving the door lock unlocking command from the user information management unit 38, the remote control instruction unit 31 transmits the unlocking command to the specific reserved vehicle 2. In the vehicle-mounted device 1, when the unlocking command is received from the remote control instruction unit 31, the second internal relay 62D, which is a normally open switch, is conductively controlled for a predetermined time. A switching contact 67D of the first external relay 65D is normally biased to a terminal 72D connected to the locking/unlocking line. A switching contact 77D of the second external relay 75D is biased to a terminal 82D connected to a terminal 70D of the first external relay 65D. Therefore, a cut portion of the locking/unlocking line 74D is normally bypassed via the terminal 72D, the switching contact 67D, the terminal 70D, the terminal 82D, the switching contact 77D and a terminal 80D. When the second internal relay 62D, which is a normally open switch, is conductively controlled for a predetermined time, a coil 76D of the second external relay 75D is energized, whereby the switching contact 77D is switched to a terminal 81D, which is connected to the 12V power source. Then, 12V is applied to the locking/unlocking line 74D from the 12V power source via the terminal 80D, the switching contact 77D and the terminal 81D. Therefore, the vacuum pump unit as the door lock actuator 29D is driven in the unlocking direction for a predetermined time during which the second internal relay 62D, which is a normally open switch, is conducted, and then, the door lock is unlocked. Since the second internal relay 62D, which is a normally open switch, is opened after a lapse of the predetermined time during which the second internal relay 62D is conducted, the switching contact 77D of the second external relay 75D is biased to the terminal 82D to bypass the cut portion of the locking/unlocking line 74D with the series circuit of the first external relay 65D and the second external relay 75D. Therefore, the vacuum pump unit as the door lock actuator 29D stops its operating.

When a locking command is transmitted from the user terminal 37 to the user information management unit 38, the user information management unit 38 transmits a door lock locking command for transmitting a locking command to the specific vehicle 2 to the remote control instruction unit 31. Upon receiving the door lock locking command from the user information management unit 38, the remote control instruction unit 31 transmits the locking command to the specific reserved vehicle 2. In the vehicle-mounted device 1, when the locking command is received from the remote control instruction unit 31, the first internal relay 61D, which is a normally open switch, is conductively controlled for a predetermined time. The switching contact 67D of the first external relay 65D is normally biased to the terminal 72D connected to the locking/unlocking line 74D. The switching contact 77D of the second external relay 75D is biased to the terminal 82D connected to the terminal 70D of the first external relay 65D. Therefore, the cut portion of the locking/unlocking line 74D is normally bypassed via the terminal 72D, the switching contact 67D, the terminal 70D, the terminal 82D, the switching contact 77D and the terminal 80D. When the first internal relay 61D, which is a normally open switch, is conductively controlled for a predetermined time, a coil 66D of the first external relay 65D is energized, whereby the switching contact 67D is switched to a terminal 71D, which is connected to the ground. Then, the locking/unlocking line 74D is connected to the ground via the terminal 80D, the switching contact 77D, the terminal 82D, the terminal 70D, the switching contact 67D and the terminal 71D. Therefore, the vacuum pump unit as the door lock actuator 29D is driven in the locking direction, which is opposite to the unlocking direction, for a predetermined time during which the first internal relay 61D, which is a normally open switch, is conducted, and then, the door lock is locked. Since the first internal relay 61D, which is a normally open switch, is opened after a lapse of the predetermined time during which the first internal relay 61D is conducted, the switching contact 67D of the first external relay 65D is biased to the terminal 72D to bypass the cut portion of the locking/unlocking line 74D with the series circuit of the first external relay 65D and the second external relay 75D. Therefore, the vacuum pump unit as the door lock actuator 29D stops its operating.

Eighth Embodiment

Operations of the internal relay and the external relay according to the eighth embodiment of the present invention will be described with reference to FIG. 17. FIG. 17 is a wiring diagram of a door lock actuator control circuit 26E according to the eighth embodiment. The type of the door lock actuator control circuit 26 corresponds to the above-mentioned (5) plus minus control. A locking/unlocking line 74E connected to a door lock switch 83E is connected to a centralized door lock module which is a door lock actuator 29E, and the locking/unlocking line 74E has a power supply voltage of 12 V when locked and has a ground potential when unlocked. After connecting the first external relay 65E so that the first external relay 65E bypass the locking/unlocking line 74E, the original wiring is cut at the bypassed portion of the locking/unlocking line 74E. The second internal relay 62E of the vehicle-mounted device 1 is connected between the door lock switch 83E and the door lock actuator 29E, and the first internal relay 61E of the vehicle-mounted device 1 is connected via the first external relay 65E between the door lock switch 83E and the door lock actuator 29E. By the control of the first internal relay 61E and the second internal relay 62E, the centralized door lock module as the door lock actuator 29E is driven to lock and unlock the door lock.

When an unlocking command is transmitted from the user terminal 37 to the user information management unit 38 and the user information management unit 38 determines that the unlocking command from the user terminal 37 is valid, a door lock unlocking command for transmitting an unlocking command to the specific vehicle 2 is transmitted to the remote control instruction unit 31. Upon receiving the door lock unlocking command from the user information management unit 38, the remote control instruction unit 31 transmits the unlocking command to the specific reserved vehicle 2. In the vehicle-mounted device 1, when the unlocking command is received from the remote control instruction unit 31, the second internal relay 62E, which is a normally open switch, is conductively controlled for a predetermined time. One end of the second internal relay 62E is connected to the earth, and the other end is connected to the locking/unlocking line 74E. When the second internal relay 62E, which is a normally open switch, is conductively controlled for a predetermined time, the locking/unlocking line 74E becomes into the ground potential. Therefore, the centralized door lock module is driven in the unlocking direction, and then, the door lock is unlocked.

When a locking command is transmitted from the user terminal 37 to the user information management unit 38, the user information management unit 38 transmits a door lock locking command for transmitting a locking command to the specific vehicle 2 to the remote control instruction unit 31. Upon receiving the door lock locking command from the user information management unit 38, the remote control instruction unit 31 transmits the locking command to the specific reserved vehicle 2. In the vehicle-mounted device 1, when the locking command is received from the remote control instruction unit 31, the first internal relay 61E, which is a normally open switch, is conductively controlled for a predetermined time. Since a switching contact 67E of the first external relay 65E is normally biased to a terminal 72E, a cut portion of the locking/unlocking line 74E is normally bypassed via a terminal 70E, the switching contact 67E and the terminal 72E. When the first internal relay 61E, which is a normally open switch, is conductively controlled for a predetermined time, a coil 66E of the first external relay 65E is energized, whereby the switching contact 67E is switched to a terminal 71E, which is connected to the 12V power source. Then, 12V is applied to the locking/unlocking line 74E from the 12V power source via the terminal 70E, the switching contact 67E and the terminal 71E. Therefore, the centralized door lock module as the door lock actuator 29E is driven in the locking direction, which is opposite to the unlocking direction, for a predetermined time during which the first internal relay 61E, which is a normally open switch, is conducted, and then, the door lock is locked. Since the first internal relay 61E, which is a normally open switch, is opened after a lapse of the predetermined time during which the first internal relay 61E is conducted, the switching contact 67E of the first external relay 65E is biased to the terminal 72E to bypass the cut portion of the locking/unlocking line 74E with the first external relay 65E. Therefore, the centralized door lock module as the door lock actuator 29E stops its operating.

Ninth Embodiment

In the first embodiment described above, the vehicle remote control system is applied to an internal combustion engine vehicle and makes a switch to the starting-disabled state by cutting off the engine starting control line (ST line) of the internal combustion engine using the engine starting external relay 20. In the following, an embodiment of the vehicle remote control system is described with reference to FIG. 18, which is applied to a vehicle using power other than an internal combustion engine, for example, an electric vehicle (hereinafter referred to as "EV") or a hybrid electric vehicle (hereinafter referred to as "HEV") and includes control other than the ST line control to make a switch to the starting-disabled state.

FIG. 18 illustrates a control method for the starting-disabled state. In FIG. 18, the kinds of vehicles are classified into internal combustion engine vehicle, EV, parallel HEV, series HEV, and series-parallel HEV, also classified according to whether an immobilizer is equipped, and further classified into a key type and a push type according to the starting method. FIG. 18 then illustrates which of three methods: method A, method B, and method C can be applied as the control method for the starting-disabled state. As the three control methods, the method A is cutting the ST line, the method B is disabling key authentication, and the method C is invalidating the push button.

The key type and the push type are classification according to the operation method for starting the power. The key type refers to the method in which a key is inserted into the key cylinder to start the power and switch between OFF, ACC, IGN, and START. The push type refers to the method for the smart key type, in which the power-starting push button is pushed to turn on the power.

The HEV is defined as follows. The parallel system is a system that drives wheels with a motor and an engine and charges a battery using the motor. The series system is a system that drives an electric generator with an engine for charging and drives wheels with a motor. The series-parallel system is a system that drives wheels with a motor and an engine and drives an electric generator with the engine for charging to drive the motor.

Here, the configuration of the vehicle-mounted device 1 for either an EV or an HEV has many parts common to those for an internal combustion engine vehicle illustrated in FIG. 3 but differs from the configuration for an internal combustion engine vehicle in that the EV does not include an internal combustion engine and the HEV has a mode of running with the motor alone. In the case of an EV, it is desirable to provide a means for detecting that the push button is pushed and the power is on, instead of the IGN input detecting unit 17, and the engine starting external relay 20 may be replaced by an electronic means, as will be described later. In the case of an HEV, it is desirable to provide a means for detecting that the power is on, instead of the IGN input detecting unit 17, and the engine starting external relay 20 may be replaced by an electronic means, as will be described later.

The three control methods, namely, the method A, the method B, and the method C will be described in detail below. The wiring for inserting the engine starting external relay 20 varies depending on the methods, but in any of the methods, starting the power is impossible in the starting-disabled state, and starting the power is possible in the starting-enabled state.

The method A is the method described in the first embodiment. In this method, the engine starting control line (ST line) of the internal combustion engine is cut off using the engine starting external relay 20 to make a switch to the starting-disabled state and can be applied to the internal combustion engine vehicle. In the method A, the engine starting external relay 20 is inserted to the ST line, and power supply to the starter motor is interrupted by opening the engine starting external relay 20 in the starting-disabled state, thereby preventing the starting of the engine.

The method B is a method employed by a vehicle equipped with an immobilizer. An immobilizer is a device that allows the engine to start only when authentication is successful. More specifically, a unique ID code is recorded in an IC chip called a transponder embedded in a key, and the ID code of the transponder is authenticated by the ID code registered in the electronic control device of the vehicle body. In the method B, the engine starting external relay 20 is inserted to the signal line for the ID code on the transponder side received by the vehicle from the transponder in the immobilizer or the signal line for the ID code on the vehicle side in the immobilizer, and the engine starting external relay 20 is open in the starting-disabled state, so that authentication of the ID code has failed, and therefore the engine is unable to be started in the starting-disabled state. Here, the engine starting external relay 20 is used to set the starting-disabled state. However, any means may be used as long as the authentication of the ID code has failed in the starting-disabled state, and, for example, an electronic means may be used. When an electronic means is used, it is also desirable that whether the state is the starting-disabled state or the starting-enabled state can be detected by the engine starting relay input/output 18 (see FIG. 3).

The method C is a method applied to a vehicle with a power-starting push button in a case of the smart key type. A smart key-type vehicle does not have a key cylinder for starting the power and starts the power by notifying the electronic control device that the push button is pushed. For example, a key-type EV does not exist and all EVs are of the push type. In the method C, the engine starting external relay 20 is inserted to the wiring for the push button, and the engine starting external relay 20 is open in the starting-disabled state, so that the power is not turned on by operating the push button in the starting-disabled state. Here, an example in which the engine starting external relay 20 is used to set the starting-disabled state has been described. However, any means may be used that prevents the electronic control device from being notified that the push button is pushed in the starting-disabled state. For example, an electronic means may be used. When an electronic means is used, it is also desirable that whether the state is the starting-disabled state or the starting-enabled state can be detected by the engine starting relay input/output 18 (see FIG. 3).

In the case equipped with an immobilizer and of the key type, the method A or the method B is applicable for internal combustion engine vehicles, no EV is applicable, and the method B is applicable for all of parallel HEVs, series HEVs, and series-parallel HEVs.

In the case equipped with an immobilizer and of the push type, the method A, the method B, or the method C is applicable for internal combustion engine vehicles, the method B or the method C is applicable for EVs, the method B or the method C is applicable for all of parallel HEVs, series HEVs, and series-parallel HEVs.

In the case not equipped with an immobilizer and of the key type, the method A is applicable for internal combustion engine vehicles, no EV is applicable, and no methods support parallel HEVs, series HEVs, and series-parallel HEVs.

In the case not equipped with an immobilizer and of the push type, the method A or the method C is applicable for internal combustion engine vehicles, the method C is applicable for EVs, and the method C is applicable for parallel HEVs, series HEVs, and series-parallel HEVs.

The invention claimed is:

1. A vehicle starting control system comprising:
   a server, a user terminal, a vehicle-mounted device installed in a vehicle and a door lock actuator control circuit, wherein
   the server is accessibly connected to a financial system and can monitor a status of payment of a predetermined charge for the vehicle via the financial system,
   the user terminal and the vehicle-mounted device are each equipped with a transmission/reception device of a short-range wireless communication,
   when the payment of the predetermined charge is detected, the server transmits, to the user terminal, a control command for switching a starting state of the vehicle from a starting-disable state to a starting-enable state via a wireless network,
   the transmission/reception device of the user terminal transmits the control command to the transmission/reception device of the vehicle-mounted device by the short-range wireless communication, the vehicle-mounted device switches the starting state of the vehicle from the starting-disable state to the starting-enable state based on the control command, and the door lock actuator control circuit includes a circuit that can lock and unlock a door lock by controlling an external relay, external of the vehicle-mounted device, and a door lock actuator by an operation of an internal relay, internal to the vehicle-mounted device.

2. The vehicle starting control system according to claim 1, wherein the server is connected to the financial system via a predetermined interface included in the financial system.

3. The vehicle starting control system according to claim 1, wherein the control command includes authentication information used for the vehicle-mounted device.

4. The vehicle starting control system according to claim 1, wherein the starting state of the vehicle includes at least one of a door lock state of the vehicle, an engine starting state of the vehicle, a state of an immobilizer of the vehicle, and a state of a push button for starting the vehicle.

5. The vehicle starting control system according to claim 1, wherein the door lock actuator control circuit is configured to lock and unlock the door lock using a plurality of external relays, where each of the plurality of external relays is outside of the vehicle-mounted device, and a plurality of internal relays, where each of the plurality of internal relays is inside of the vehicle-mounted device.

6. A vehicle starting control system comprising:
a server, an IC card, a vehicle-mounted device installed in a vehicle and a card reader connected to the vehicle-mounted device, wherein the server is accessibly connected to a financial system and can monitor a status of payment of a predetermined charge for the vehicle via the financial system, when the payment of the predetermined charge is detected, the server writes, to the IC card, a control command for switching a starting state of the vehicle from a starting-disable state to a starting-enable state via a wireless network, the IC card transmits the control command to the card reader by a short-range wireless communication, the vehicle-mounted device switches the starting state of the vehicle from the starting-disable state to the starting-enable state based on the control command acquired via the card reader, and the door lock actuator control circuit includes a circuit that can lock and unlock a door lock by controlling an external relay, external of the vehicle-mounted device, and a door lock actuator by an operation of an internal relay, internal to the vehicle-mounted device.

7. The vehicle starting control system according to claim 6, wherein the server is connected to the financial system via a predetermined interface included in the financial system.

8. The vehicle starting control system according to claim 6, wherein the control command includes authentication information used for the vehicle-mounted device.

9. The vehicle starting control system according to claim 6, wherein the starting state of the vehicle includes at least one of a door lock state of the vehicle, an engine starting state of the vehicle, a state of an immobilizer of the vehicle, and a state of a push button for starting the vehicle.

10. The vehicle starting control system according to claim 6, wherein the door lock actuator control circuit is configured to lock and unlock the door lock using a plurality of external relays, where each of the plurality of external relays is outside of the vehicle-mounted device, and a plurality of internal relays, where each of the plurality of internal relays is inside of the vehicle-mounted device.

* * * * *